(12) United States Patent  
Wang et al.

(10) Patent No.: US 11,943,431 B2
(45) Date of Patent: Mar. 26, 2024

(54) EXTERNAL DECODING REFRESH (EDR) IN VIDEO CODING

(71) Applicant: Huawei Technologies Co., Ltd., Shenzhen (CN)

(72) Inventors: Ye-Kui Wang, San Diego, CA (US); Fnu Hendry, San Diego, CA (US); Jianle Chen, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 217 days.

(21) Appl. No.: 17/592,256

(22) Filed: Feb. 3, 2022

(65) Prior Publication Data

US 2022/0159245 A1 May 19, 2022

Related U.S. Application Data

(63) Continuation of application No. PCT/US2020/041032, filed on Jul. 7, 2020.
(Continued)

(51) Int. Cl.
*H04N 19/105* (2014.01)
*H04N 19/14* (2014.01)
(Continued)

(52) U.S. Cl.
CPC ........... *H04N 19/105* (2014.11); *H04N 19/14* (2014.11); *H04N 19/146* (2014.11);
(Continued)

(58) Field of Classification Search
CPC .... H04N 19/105; H04N 19/14; H04N 19/146; H04N 19/172; H04N 19/115;
(Continued)

(56) References Cited

U.S. PATENT DOCUMENTS

| 2007/0110154 A1 | 5/2007 | Wang | |
| 2013/0142257 A1* | 6/2013 | Wang | H04N 19/172 375/240.12 |

(Continued)

OTHER PUBLICATIONS

"Line Transmission of Non-Telephone Signals, Video Codec for Audiovisual Services at p x 64 kbits," ITU-T Recommendation H.261, Mar. 3, 1993, 29 pages.
(Continued)

*Primary Examiner* — Richard T Torrente
(74) *Attorney, Agent, or Firm* — Conley Rose, P.C.

(57) ABSTRACT

A method of decoding a coded video bitstream is provided. The method includes receiving a bitstream containing an external decoder refresh (EDR) picture and a list of pictures for the EDR picture. The list of pictures lists pictures referred to by entries in a first reference picture list, pictures referred to by entries in a second reference picture list, and external pictures in increasing decoding order. A difference between picture order count values for any two consecutive pictures in the list of pictures is greater than one half of a negative of maximum picture order count least significant bits and less than one half of the maximum picture order count least significant bits. The method further includes obtaining an external picture from the the external pictures referred to in the list of pictures and decoding the EDR picture using the external picture that was obtained.

22 Claims, 14 Drawing Sheets

Related U.S. Application Data

(60) Provisional application No. 62/897,823, filed on Sep. 9, 2019, provisional application No. 62/885,040, filed on Aug. 9, 2019.

(51) Int. Cl.
  *H04N 19/146* (2014.01)
  *H04N 19/172* (2014.01)
  *H04N 19/115* (2014.01)
  *H04N 19/159* (2014.01)
  *H04N 19/46* (2014.01)

(52) U.S. Cl.
  CPC ......... *H04N 19/172* (2014.11); *H04N 19/115* (2014.11); *H04N 19/159* (2014.11); *H04N 19/46* (2014.11)

(58) Field of Classification Search
  CPC .... H04N 19/159; H04N 19/46; H04N 19/174; H04N 19/70; H04N 19/107
  See application file for complete search history.

(56) References Cited

U.S. PATENT DOCUMENTS

| | | | |
|---|---|---|---|
| 2018/0131938 A1* | 5/2018 | Lu | H04N 9/67 |
| 2019/0141320 A1 | 5/2019 | Wang | |

OTHER PUBLICATIONS

"Series H: Audio Visual and Multimedia Systems Infrastructure of Audio Visual Services—Coding of Moving Video—Advanced Video Coding for Generic Audiovisual Services", ITU-T Recommendation H.264, Jun. 2019, 836 pages.

"Series H: Audiovisual and Multimedia Systems—Infrastructure of Audiovisual Services—Coding of Moving Video—High Efficiency Video Coding," ITU-T, H.265, Feb. 2018, 692 pages.

"Transmission of Non-Telephone Signals, Information Technology—Generic Coding of Moving Pictures and Associated Audio Information: Video," ITU-T H.262, Jul. 1995, 211 pages.

"Video Coding for Low Bit Rate Communication," Series H: Audiovisual and Multimedia Systems Infrastructure of Audiovisual Services—Coding of Moving Video, ITU-T H.263, Jan. 2005, 226 pages.

Bross, et al., "Versatile Video Coding (Draft 5)," Document: JVET-N1001-v3, Joint Video Experts Team (JVET) of ITU-T SG 16 WP 3 and ISO/IEC JTC 1/SC 29/WG 11, 14th Meeting: Geneva, CH, Mar. 19-27, 2019, 371 pages.

Bross, et al., "Versatile Video Coding (Draft 6)," Joint Video Experts Team (JVET) of ITU-T SG 16 WP 3 and ISO/IEC JTC 1/2C 29/WG 11 15th Meeting: Gothenburg, SE, Jul. 3-12, 2019, Document JVET-O2001vE, 455 pages.

Wang, et al., "AHG17: On external decoding refresh (EDR)," Joint Video Experts Team (JVET) of ITU-T SG 16 WP 3 and ISO/IEC JTC 1/SC 29/WG 11, 15th Meeting: Gothenburg, SE, Jul. 3-12, 2019, Document JVET-O0149-v1, 6 pages.

Document: JVET-P0114-v1, Wang, Y-K., et al., "AHG17: On external decoding refresh (EDR)", Joint Video Experts Team (JVET) of ITU-T SG 16 WP 3 and ISO/IEC JTC 1/SC 29/WG 11 16th Meeting: Geneva, CH, Oct. 1-11, 2019, XP055963282, 7 pages.

Document: JVET-M0360-v4, Yu, H., et al., "Video coding based on cross RAP referencing (CRR)", Joint Video Exploration Team (JVET) of ITU-T SG 16 WP 3 and ISO/IECJTC 1 /SC 29/WG 11 13th Meeting: Marrakech, MA, Jan. 9-18, 2019, XP055963453, 6 pages.

\* cited by examiner

EXTERNAL DECODING REFRESH (EDR) IN VIDEO CODING

CROSS-REFERENCE TO RELATED APPLICATIONS

This patent application is a continuation of International Application No. PCT/US2020/041032 filed on Jul. 7, 2020 by Futurewei Technologies, Inc., and titled "External Decoding Refresh (EDR) in Video Coding," which claims the benefit of U.S. Provisional Patent Application No. 62/885,040 filed Aug. 9, 2019, by Futurewei Technologies, Inc., and titled "Design of External Decoding Refresh in Video Coding," and U.S. Provisional Patent Application No. 62/897,823 filed Sep. 9, 2019, by Futurewei Technologies, Inc., and titled "Design of External Decoding Refresh in Video Coding," each of which is hereby incorporated by reference.

TECHNICAL FIELD

In general, this disclosure describes techniques that support the use of random access pictures in video coding. More specifically, this disclosure provides techniques that restrict a difference between the picture order count values for any two consecutive pictures in a list of pictures to a limited range when providing random access using an external decoder refresh (EDR) picture.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of decoding implemented by a video decoder. The method includes receiving, by the video decoder, a bitstream containing an external decoder refresh (EDR) picture and a list of pictures for the EDR picture, wherein the list of pictures lists pictures referred to by entries in a first reference picture list, the pictures referred to by the entries in a second reference picture list, and external pictures in increasing decoding order, and wherein a difference between picture order count values for any two consecutive pictures in the list of pictures is greater than one half of a negative of maximum picture order count least significant bits and less than one half of the maximum picture order count least significant bits; obtaining, by the video decoder, one of the external pictures referred to in the list of pictures; and decoding, by the video decoder, the EDR picture using the external reference picture that was obtained.

The method provides techniques that restrict a difference between the picture order count values for any two consecutive pictures in a list of pictures to a limited range when providing random access using an external decoder refresh (EDR) picture. By restricting the difference between picture order count values for any two consecutive pictures in a list of pictures to the limited range, the number of bits needed for signaling the picture order count values is reduced, which improves coding efficiency. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the one of the external pictures is a reference EDR picture.

Optionally, in any of the preceding aspects, another implementation of the aspect provides the one of the external pictures is a reference intra random access point (IRAP) picture.

Optionally, in any of the preceding aspects, another implementation of the aspect provides that the one of the external pictures is obtained from a second bitstream.

Optionally, in any of the preceding aspects, another implementation of the aspect provides that the picture order count values are picture order count (POC) least significant bits (LSBs).

Optionally, in any of the preceding aspects, another implementation of the aspect provides the list of pictures containing the picture order count values are signaled in a slice header of the bitstream.

A second aspect relates to a method of encoding implemented by a video encoder. The method includes generating, by the video encoder, an external decoder refresh (EDR) picture and a list of pictures for the EDR picture, wherein the list of pictures lists pictures referred to by entries in a first reference picture list, the pictures referred to by the entries in a second reference picture list, and external pictures in increasing decoding order, and wherein a difference between picture order count values for any two consecutive pictures in the list of pictures is greater than one half of a negative of maximum picture order count least significant bits and less than one half of the maximum picture order count least significant bits; encoding, by the video encoder, the EDR picture and the list of pictures for the EDR picture into a bitstream; and storing, by the video encoder, the bitstream for transmission toward a video decoder.

The method provides techniques that restrict a difference between the picture order count values for any two consecutive pictures in a list of pictures to a limited range when providing random access using an external decoder refresh (EDR) picture. By restricting the difference between picture order count values for any two consecutive pictures in a list of pictures to the limited range, the number of bits needed for signaling the picture order count values is reduced, which improves coding efficiency. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the one of the external pictures is a reference EDR picture.

Optionally, in any of the preceding aspects, another implementation of the aspect provides that the one of the external pictures is a reference intra random access point (IRAP) picture.

Optionally, in any of the preceding aspects, another implementation of the aspect provides that the one of the external pictures is obtained from a second bitstream.

Optionally, in any of the preceding aspects, another implementation of the aspect provides that the picture order count values are picture order count (POC) least significant bits (LSBs).

Optionally, in any of the preceding aspects, another implementation of the aspect provides encoding the list of pictures containing the picture order count values in a slice header of the bitstream.

A third aspect relates to a decoding device. The decoding device includes a receiver configured to receive a coded video bitstream; a memory coupled to the receiver, the memory storing instructions; and a processor coupled to the memory, the processor configured to execute the instructions to cause the decoding device to: receive a bitstream containing an external decoder refresh (EDR) picture and a list of pictures for the EDR picture, wherein the list of pictures lists pictures referred to by entries in a first reference picture list, the pictures referred to by the entries in a second reference picture list, and external pictures in increasing decoding order, and wherein a difference between picture order count values for any two consecutive pictures in the list of pictures is greater than one half of a negative of maximum picture order count least significant bits and less than one half of the maximum picture order count least significant bits; obtain one of the external pictures referred to in the list of pictures; and decode the EDR picture using the external reference picture that was obtained.

The decoding device provides techniques that restrict a difference between the picture order count values for any two consecutive pictures in a list of pictures to a limited range when providing random access using an external decoder refresh (EDR) picture. By restricting the difference between picture order count values for any two consecutive pictures in a list of pictures to the limited range, the number of bits needed for signaling the picture order count values is reduced, which improves coding efficiency. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that one of the external pictures is a reference EDR picture or a reference intra random access point (IRAP) picture.

Optionally, in any of the preceding aspects, another implementation of the aspect provides that the one of the external pictures is obtained from a second bitstream.

Optionally, in any of the preceding aspects, another implementation of the aspect provides the picture order count values are picture order count (POC) least significant bits (LSBs).

Optionally, in any of the preceding aspects, another implementation of the aspect provides a display configured to display an image as generated based on the EDR picture.

A fourth aspect relates to an encoding device. The encoding device includes a memory containing instructions; a processor coupled to the memory, the processor configured to implement the instructions to cause the encoding device to: generate an external decoder refresh (EDR) picture and a list of pictures for the EDR picture, wherein the list of pictures lists pictures referred to by entries in a first reference picture list, the pictures referred to by the entries in a second reference picture list, and external pictures in increasing decoding order, and wherein a difference between picture order count values for any two consecutive pictures in the list of pictures is greater than one half of a negative of maximum picture order count least significant bits and less than one half of the maximum picture order count least significant bits; and encode the EDR picture and the list of pictures for the EDR picture into a bitstream; and a transmitter coupled to the processor, the transmitter configured to transmit the bitstream toward a video decoder.

The encoding device provides techniques that restrict a difference between the picture order count values for any two consecutive pictures in a list of pictures to a limited range when providing random access using an external decoder refresh (EDR) picture. By restricting the difference between picture order count values for any two consecutive pictures in a list of pictures to the limited range, the number of bits needed for signaling the picture order count values is reduced, which improves coding efficiency. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the one of the external pictures is a reference EDR picture or a reference intra random access point (IRAP) picture.

Optionally, in any of the preceding aspects, another implementation of the aspect provides that the one of the external pictures is obtained from a second bitstream.

Optionally, in any of the preceding aspects, another implementation of the aspect provides that the picture order count values are picture order count (POC) least significant bits (LSBs).

Optionally, in any of the preceding aspects, another implementation of the aspect provides that the memory stores the bitstream prior to the transmitter transmitting the bitstream toward the video decoder.

A fifth aspect relates to a coding apparatus. The coding apparatus includes a receiver configured to receive a picture to encode or to receive a bitstream to decode; a transmitter coupled to the receiver, the transmitter configured to transmit the bitstream to a decoder or to transmit a decoded image to a display; a memory coupled to at least one of the receiver or the transmitter, the memory configured to store instructions; and a processor coupled to the memory, the processor configured to execute the instructions stored in the memory to perform any of the methods disclosed herein.

The coding apparatus provides techniques that restrict a difference between the picture order count values for any two consecutive pictures in a list of pictures to a limited range when providing random access using an external decoder refresh (EDR) picture. By restricting the difference between picture order count values for any two consecutive pictures in a list of pictures to the limited range, the number of bits needed for signaling the picture order count values is reduced, which improves coding efficiency. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides a display configured to display an image.

A sixth aspect relates to a system. The system includes an encoder; and a decoder in communication with the encoder, wherein the encoder or the decoder includes the decoding device, the encoding device, or the coding apparatus disclosed herein.

The system provides techniques that restrict a difference between the picture order count values for any two consecutive pictures in a list of pictures to a limited range when providing random access using an external decoder refresh (EDR) picture. By restricting the difference between picture order count values for any two consecutive pictures in a list of pictures to the limited range, the number of bits needed for signaling the picture order count values is reduced, which improves coding efficiency. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

A seventh aspect relates to a means for coding. The means for coding comprises receiving means configured to receive a picture to encode or to receive a bitstream to decode; transmission means coupled to the receiving means, the transmission means configured to transmit the bitstream to a decoding means or to transmit a decoded image to a display means; storage means coupled to at least one of the receiving means or the transmission means, the storage means configured to store instructions; and processing means coupled to the storage means, the processing means configured to execute the instructions stored in the storage means to perform any of the methods disclosed herein.

The means for coding provides techniques that restrict a difference between the picture order count values for any two consecutive pictures in a list of pictures to a limited range when providing random access using an external decoder refresh (EDR) picture. By restricting the difference between picture order count values for any two consecutive pictures in a list of pictures to the limited range, the number of bits needed for signaling the picture order count values is reduced, which improves coding efficiency. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
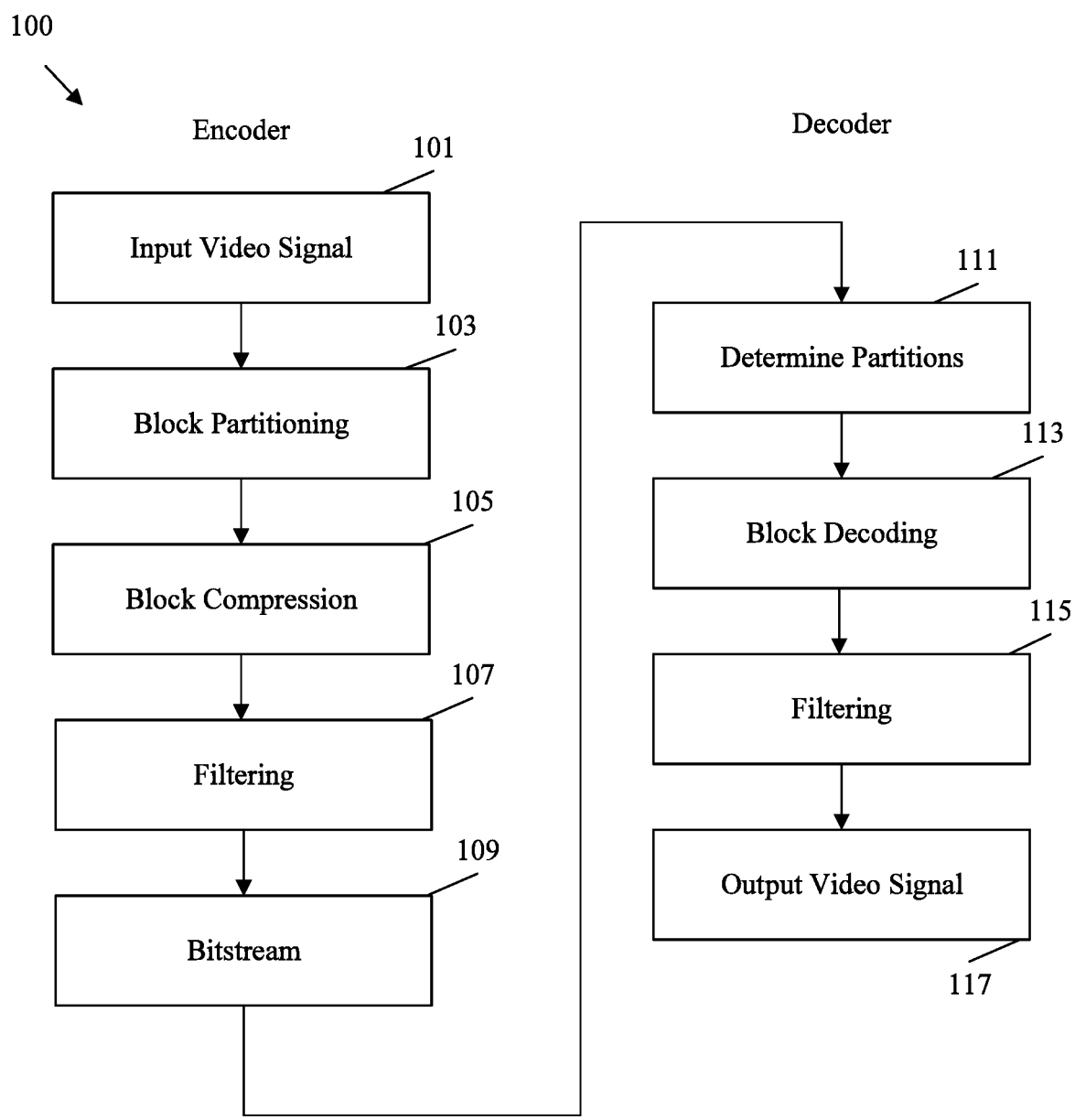
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence of bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is an array of luma samples and/or an array of chroma samples that create a frame or a field thereof. A picture that is being encoded or decoded can be referred to as a current picture for clarity of discussion. A reference picture is a picture that contains reference samples that can be used when coding other pictures by reference according to inter-prediction and/or inter-layer prediction. A reference picture list is a list of reference pictures used for inter-prediction and/or inter-layer prediction. Some video coding systems utilize two reference picture lists, which can be denoted as reference picture list one and reference picture list zero. A reference picture list structure is an addressable syntax structure that contains multiple reference picture lists. Inter-prediction is a mechanism of coding samples of a current picture by reference to indicated samples in a reference picture that is different from the current picture where the reference picture and the current picture are in the same layer. A reference picture list structure entry is an addressable location in a reference picture list structure that indicates a reference picture associated with a reference picture list. A slice header is a part of a coded slice containing data elements pertaining to all video data within a tile represented in the slice. A sequence parameter set (SPS) is a parameter set that contains data related to a sequence of pictures. An access unit (AU) is a set of one or more coded pictures associated with the same display time (e.g., the same picture order count) for output from a decoded picture buffer (DPB) (e.g., for display to a user). A decoded video sequence is a sequence of pictures that have been reconstructed by a decoder in preparation for display to a user. An intra random access point (IRAP) picture provides a point in a bitstream where decoding can begin. For example, decoding can begin at an IRAP picture so that pictures following the IRAP picture in output order, inclusive, can be output even if all pictures that precede the IRAP picture in decoding order are discarded from the bitstream (e.g., due to bitstream splicing, or the like). Because it is possible to start decoding at an IRAP picture, an IRAP picture is not dependent on any other picture in the bitstream. Decoding order is the order in which pictures are decoded. List of pictures is a listing of pictures. An external picture, also known as an earlier picture, is a picture that precedes an IRAP picture in decoding order. Picture order count (POC) determines the display (output) order of decoded frames or pictures. That is, a POC comprises a variable that is associated with each picture, uniquely identifies the associated picture among all pictures in the coded layer video sequence (CLVS), and indicates when the associated picture is to be output from the DPB. The POC least significant bits (LSBs) are the lowest bits in the picture order count variable, and the POC most significant bits (MSBs) are the highest bits in the picture order count variable. The maximum POC is greatest value that the variable for the POC can have. The maximum POC LBS are the lowest bits of the maximum POC.

External decoding refresh (EDR), also referred to as cross RAP reference (CRR), allows random access point pictures to be inter coded instead of intra coded. The basic idea of the EDR approach is as follows. Instead of coding random access points (except for the very first one in the bitstream) as intra-coded IRAP pictures, they are coded using inter prediction to circumvent the unavailability of the earlier pictures than an IRAP picture. Such pictures are referred to as EDR pictures. The trick is to provide a limited number of the earlier pictures, typically representing different scenes of the video content, through a separate video bitstream, which can be referred to as an external means. Such earlier pictures are referred to as the external pictures. Consequently, each external picture can be used for inter prediction referencing by pictures across the random access points. The coding efficiency gain basically comes from inter coding of the random access points. When a picture uses an EDR picture for reference, that EDR picture may be referred to as a reference EDR picture.

The following acronyms are used herein, Adaptive Loop Filter (ALF), Coding Tree Block (CTB), Coding Tree Unit (CTU), Coding Unit (CU), Coded Video Sequence (CVS), decoded picture buffer (DPB), External Decoding Refresh (EDR), Group Of Pictures (GOP), Joint Video Experts Team (JVET), Motion-Constrained Tile Set (MCTS), Most Significant Bit(s) (MSB), Maximum Transfer Unit (MTU), Network Abstration Layer (NAL), Picture Order Count (POC), Random Access Point (RAP), Raw Byte Sequence Payload (RBSP), Sample Adaptive Offset (SAO), Supplemental Enhancement Information (SEI), Sequence Parameter Set (SPS), Temporal Motion Vector Prediction (TMVP), Versatile Video Coding (VVC), and Working Draft (WD).

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
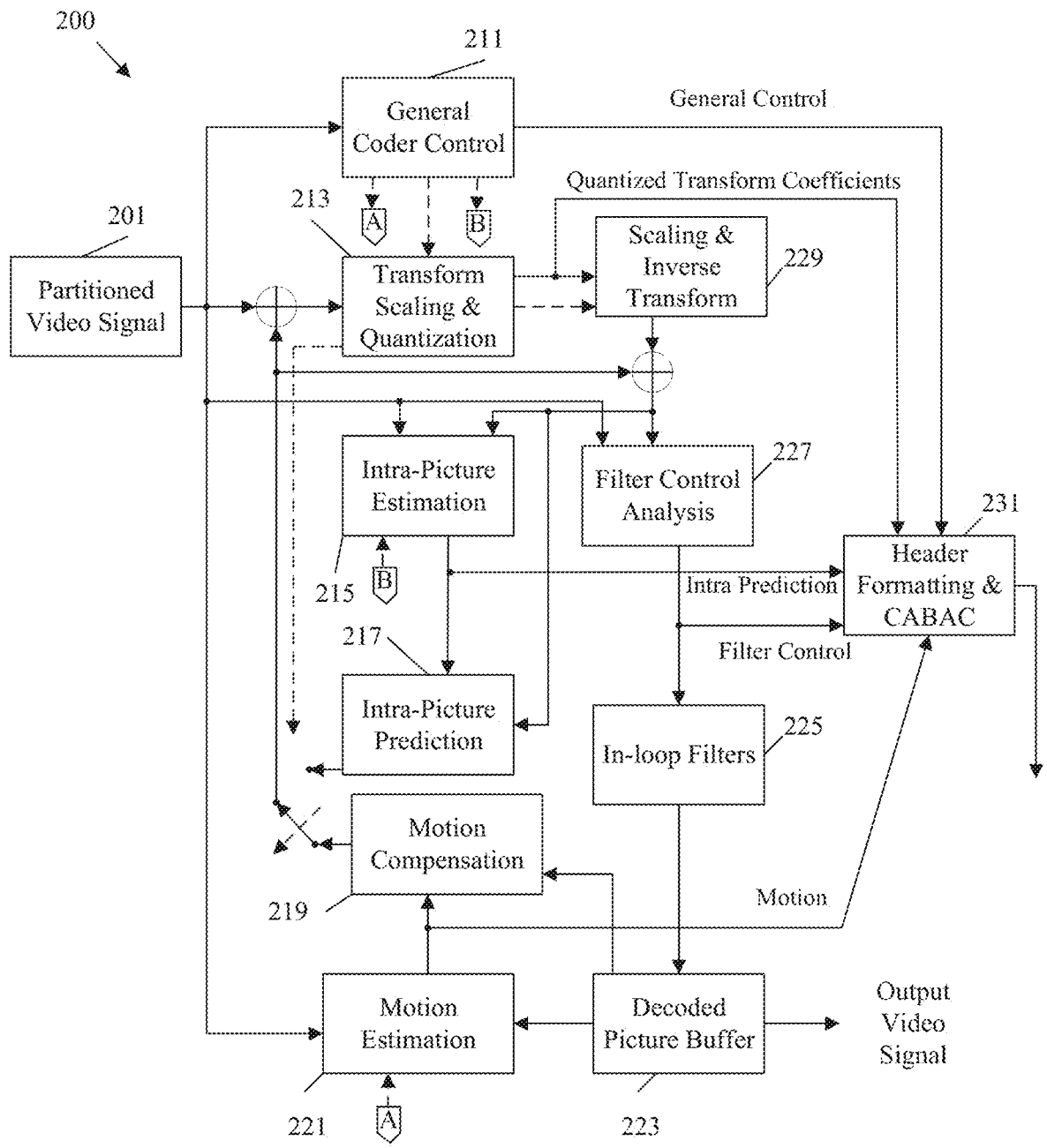
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
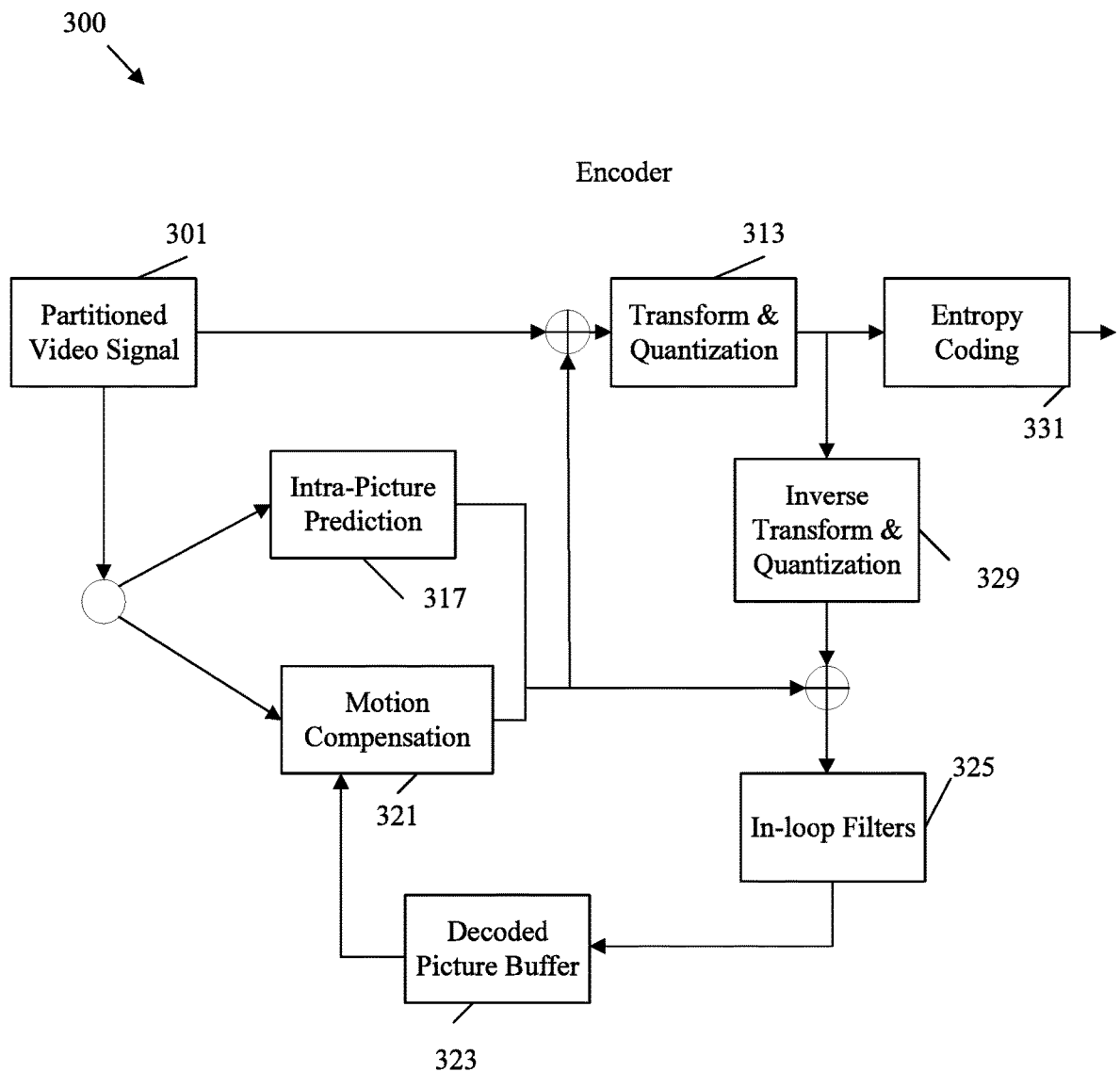
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
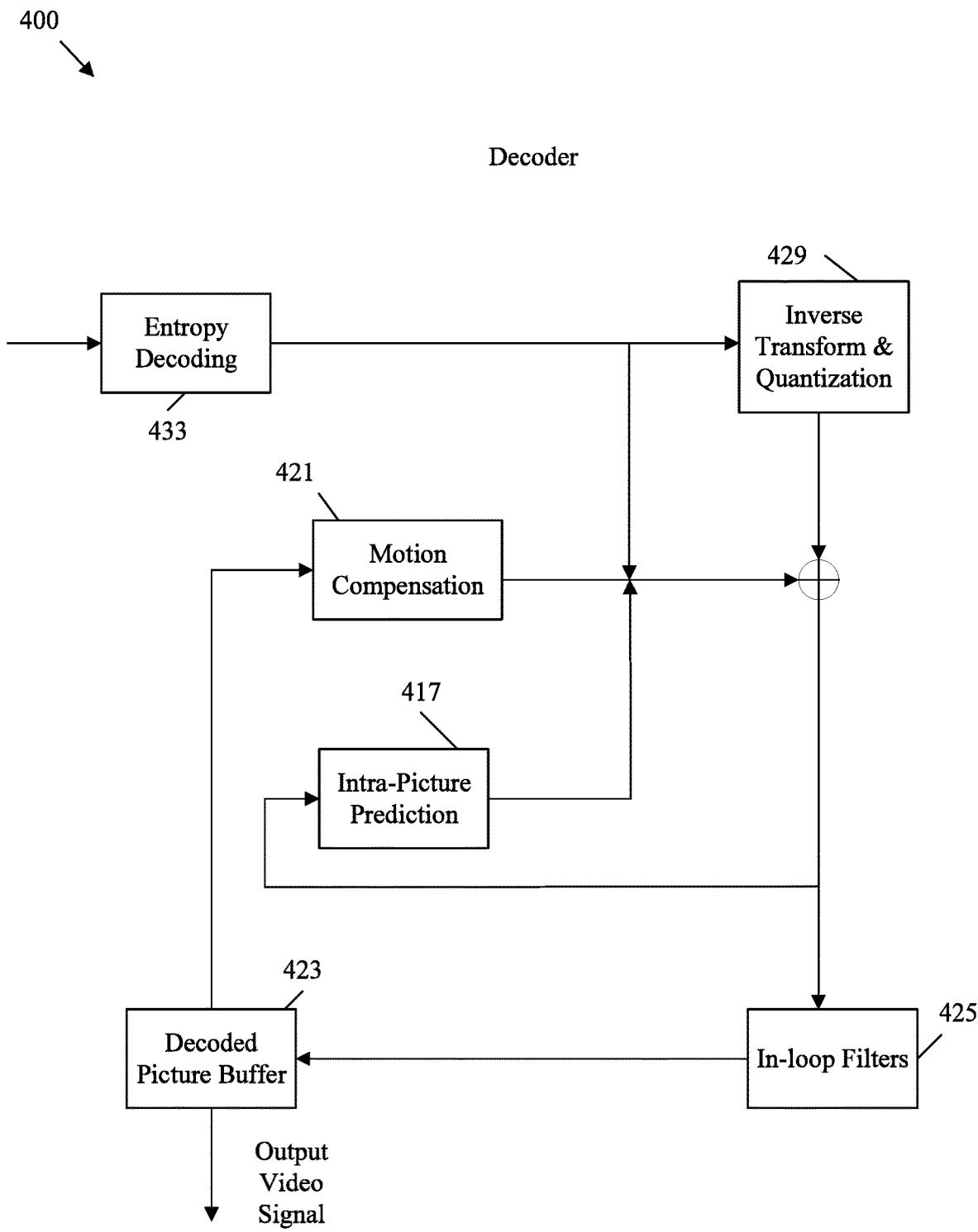
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Keeping the above in mind, video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Image and video compression has experienced rapid growth, leading to various coding standards. Such video coding standards include ITU-T H.261, International Organization for Standardization/International Electrotechnical Commission (ISO/IEC) MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

There is also a new video coding standard, named Versatile Video Coding (VVC), being developed by the joint video experts team (WET) of ITU-T and ISO/IEC. While the VVC standard has several working drafts, one Working Draft (WD) of VVC in particular, namely B. Bross, J. Chen, and S. Liu, "Versatile Video Coding (Draft 5)," JVET-N1001-v3, 13th JVET Meeting, Mar. 27, 2019 (VVC Draft 5) is referenced herein.

The description of the techniques disclosed herein are based on the under-development video coding standard Versatile Video Coding (VVC) by the joint video experts team (JVET) of ITU-T and ISO/IEC. However, the techniques also apply to other video codec specifications.

Figure 5:
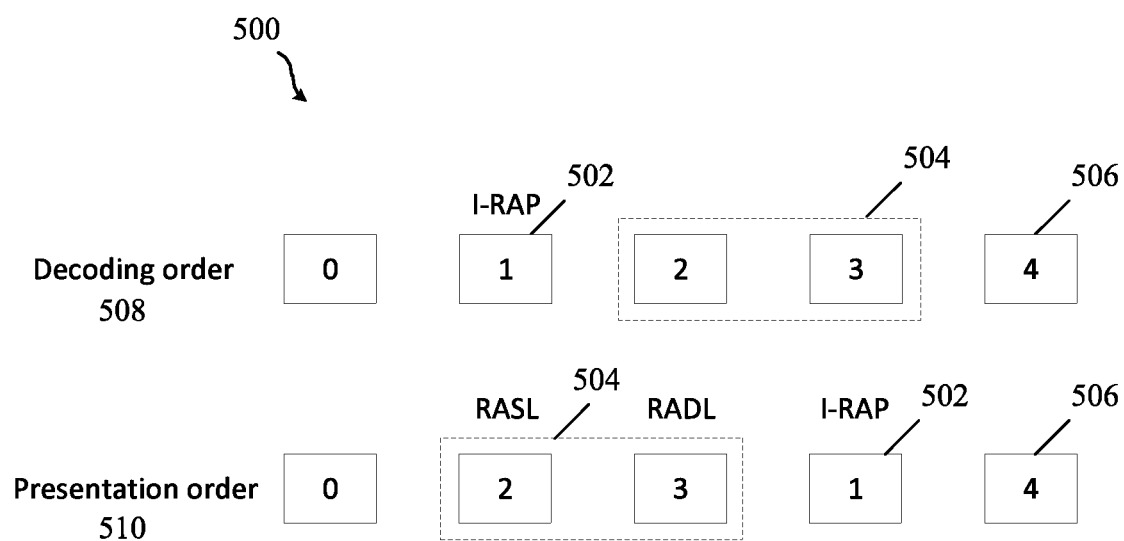
FIG. 5 is a representation of a relationship between an IRAP picture relative to leading pictures and trailing pictures in a decoding order and a presentation order.

FIG. 5 is a representation 500 of a relationship between an intra random access point (IRAP) picture 502 relative to leading pictures 504 and trailing pictures 506 in a decoding order 508 and a presentation order 510. In an embodiment, the IRAP picture 502 is referred to as a clean random access (CRA) picture or as an instantaneous decoder refresh (IDR) picture with random access decodable (RADL) picture. In HEVC, IDR pictures, CRA pictures, and Broken Link Access (BLA) pictures are all considered IRAP pictures 502. For VVC, during the 12th JVET meeting in October 2018, it was agreed to have both IDR and CRA pictures as IRAP pictures. In an embodiment, Broken Link Access (BLA) and Gradual Decoder Refresh (GDR) pictures may also be considered to be IRAP pictures. The decoding process for a coded video sequence always starts at an IRAP.

As shown in FIG. 5, the leading pictures 504 (e.g., pictures 2 and 3) follow the IRAP picture 502 in the decoding order 508, but precede the IRAP picture 502 in the presentation order 510. The trailing picture 506 follows the IRAP picture 502 in both the decoding order 508 and in the presentation order 510 (a.k.a., output order). While two leading pictures 504 and one trailing picture 506 are depicted in FIG. 5, those skilled in the art will appreciate that more or fewer leading pictures 504 and/or trailing pictures 506 may be present in the decoding order 508 and the presentation order 510 in practical applications.

The leading pictures 504 in FIG. 5 have been divided into two types, namely random access skipped leading (RASL) and RADL. When decoding starts with the IRAP picture 502 (e.g., picture 1), the RADL picture (e.g., picture 3) can be properly decoded; however, the RASL picture (e.g., picture 2) cannot be properly decoded. Thus, the RASL picture is discarded. In light of the distinction between RADL and RASL pictures, the type of leading picture 504 associated with the IRAP picture 502 should be identified as either RADL or RASL for efficient and proper coding. In HEVC, when RASL and RADL pictures are present, it is constrained that for RASL and RADL pictures that are associated with the same IRAP picture 502, the RASL pictures shall precede the RADL pictures in presentation order 510.

An IRAP picture 502 provides the following two important functionalities/benefits. Firstly, the presence of an IRAP picture 502 indicates that the decoding process can start from that picture. This functionality allows a random access feature in which the decoding process starts at that position in the bitstream, not necessarily the beginning of the bitstream, as long as an IRAP picture 502 is present at that position. Secondly, the presence of an IRAP picture 502 refreshes the decoding process such that a coded picture starting at the IRAP picture 502, excluding RASL pictures, are coded without any reference to previous pictures. Having an IRAP picture 502 present in the bitstream consequently would stop any error that may happen during decoding of coded pictures prior to the IRAP picture 502 to propagate to the IRAP picture 502 and those pictures that follow the IRAP picture 502 in decoding order 508.

While IRAP pictures 502 provide important functionalities, they come with a penalty to the compression efficiency. The presence of an IRAP picture 502 causes a surge in bitrate. This penalty to the compression efficiency is due to two reasons. Firstly, as an IRAP picture 502 is an intra-predicted picture, the picture itself would require relatively more bits to represent when compared to other pictures (e.g., leading pictures 504, trailing pictures 506) that are inter-predicted pictures. Secondly, because the presence of an IRAP picture 502 breaks temporal prediction (this is because the decoder would refresh the decoding process, in which one of the actions of the decoding process for this is to remove previous reference pictures in the decoded picture buffer (DPB)), the IRAP picture 502 causes the coding of pictures that follow the IRAP picture 502 in decoding order 508 to be less efficient (i.e., needs more bits to represent) because they have less reference pictures for their inter-prediction coding.

Among the picture types that are considered IRAP pictures 502, the IDR picture in HEVC has different signaling and derivation when compared to other picture types. Some of the differences are as follows.

For signaling and derivation of a picture order count (POC) value of an IDR picture, the most significant bit (MSB) part of the POC is not derived from the previous key picture but simply set to be equal to 0.

For signaling information needed for reference picture management, the slice header of an IDR picture does not contain information needed to be signaled to assist reference picture management. For other picture types (i.e., CRA, Trailing, temporal sub-layer access (TSA), etc.), information such as the reference picture set (RPS) described below or other forms of similar information (e.g., reference picture lists) are needed for the reference pictures marking process (i.e., the process to determine the status of reference pictures in the decoded picture buffer (DPB), either used for reference or unused for reference). However, for the IDR picture, such information does not need to be signaled because the presence of IDR indicates that the decoding process shall simply mark all reference pictures in the DPB as unused for reference.

The latest draft specification of VVC supports two types of IRAP pictures, namely IDR pictures and CRA pictures.

In HEVC and VVC, IRAP pictures and leading pictures are given different NAL unit types so that they can be easily identified by system level applications. For example, a video splicer needs to understand coded picture types without having to understand too much detail of the syntax element in the coded bitstream, particularly to identify IRAP pictures from non-IRAP pictures and to identify leading pictures, including determining RASL and RADL pictures, from trailing pictures. Trailing pictures are those pictures that are associated with an IRAP picture and follow the IRAP picture in output order. A picture associated with a particular IRAP picture is such a picture that follows the particular IRAP picture in decoding order and precedes any other IRAP picture in decoding order. For this, giving IRAP and leading pictures their own NAL unit type helps such applications.

A so-called external decoding refresh (EDR) based video coding approach is described in the document JVET-O0149 (publically available herein: http://phenix.int-evry.fr/jvet/doc_end_user/documents/15_Gothenburg/wg11/JVET-O0149-v1.zip). As reported in JVET-O0149, the approach can provide significant video compression gain of up to about thirty-one percent (31%) for certain video content.

In AVC, HEVC, and the current design of VVC, an IRAP picture is not only coded as an intra picture, but also the decoding of an IRAP picture when random accessing from the IRAP picture would flush the DPB. Consequently, pictures earlier than the IRAP would not be available for inter-predication reference by the IRAP picture and pictures following the IRAP picture in decoding order. To circumvent the unavailability of the earlier pictures, referred to as the external pictures in JVET-O0149, the approach in JVET-O0149 employs a trick by providing the earlier pictures through a separate video bitstream, which can be referred to as an external means. As such, each external picture can be used for inter prediction reference by pictures starting from the random accessible picture that would conventionally be coded as an IRAP picture.

The EDR design in JVET-O0149 is summarized as follows:

1) An EDR picture is a random accessible picture for which one or more external pictures are needed when random accessing from the picture.
2) An EDR picture may start a CVS (hence may also start a bitstream).
3) External pictures are provided in the form of coded pictures instead of decoded pictures.
4) There is no change to RPL syntax, semantics, and derivation process.
5) A new NAL unit type (EDR NUT) is defined for EDR pictures.
6) For each EDR picture, the POC MSB values of the external pictures and the EDR picture itself are signaled in the slice headers, and the POC values of the external pictures and the EDR picture are derived based on the POC LSBs signaled in each slice header and these POC MSB values.

The problems with the existing designs are discussed.

In the EDR design in JVET-O0149, for each EDR picture, the POC MSB values of the external pictures and the EDR picture itself are signaled in the slice headers of the EDR picture. However, it is possible to use more bits for the POC least significant bits (LSBs) signaled in each slice header, such that when decoding the bitstream when random accessing from an EDR picture, i.e., the bitstream consisting of the external pictures, the EDR picture, and all the following pictures, the POC values of the all the pictures, particularly the POC values of the external pictures and the EDR picture, can be derived based on the POC LSBs signaled in each slice header using the usual POC derivation process. This way, signaling of the POC MSB values of the external pictures and the EDR picture itself can be avoided.

Disclosed herein are techniques that restrict a difference between the picture order count values for any two consecutive pictures in a list of pictures to a limited range when providing random access using an external decoder refresh (EDR) picture. By restricting the difference between picture order count values for any two consecutive pictures in a list of pictures to the limited range, the number of bits needed for signaling the picture order count values is reduced, which improves coding efficiency. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

Figure 6:
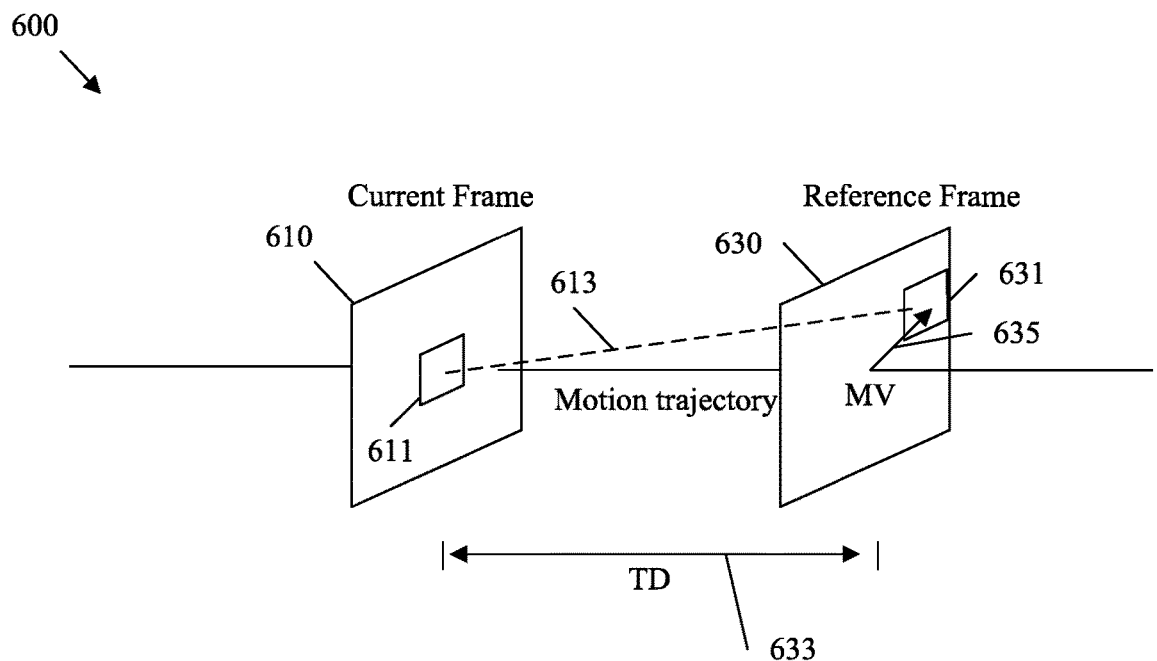
FIG. 6 is a schematic diagram illustrating an example of unidirectional inter prediction.

FIG. 6 is a schematic diagram illustrating an example of unidirectional inter prediction 600. Unidirectional inter prediction 600 can be employed to determine motion vectors for encoded and/or decoded blocks created when partitioning a picture.

Unidirectional inter prediction 600 employs a reference frame 630 with a reference block 631 to predict a current block 611 in a current frame 610. The reference frame 630 may be temporally positioned after the current frame 610 as shown (e.g., as a subsequent reference frame), but may also be temporally positioned before the current frame 610 (e.g., as a preceding reference frame) in some examples. The current frame 610 is an example frame/picture being encoded/decoded at a particular time. The current frame 610 contains an object in the current block 611 that matches an object in the reference block 631 of the reference frame 630. The reference frame 630 is a frame that is employed as a reference for encoding a current frame 610, and a reference block 631 is a block in the reference frame 630 that contains an object also contained in the current block 611 of the current frame 610.

The current block 611 is any coding unit that is being encoded/decoded at a specified point in the coding process. The current block 611 may be an entire partitioned block, or may be a sub-block when employing affine inter prediction mode. The current frame 610 is separated from the reference frame 630 by some temporal distance (TD) 633. The TD 633 indicates an amount of time between the current frame 610 and the reference frame 630 in a video sequence, and may be measured in units of frames. The prediction information for the current block 611 may reference the reference frame 630 and/or reference block 631 by a reference index indicating the direction and temporal distance between the frames. Over the time period represented by the TD 633, the object in the current block 611 moves from a position in the current frame 610 to another position in the reference frame 630 (e.g., the position of the reference block 631). For example, the object may move along a motion trajectory 613, which is a direction of movement of an object over time. A motion vector 635 describes the direction and magnitude of the movement of the object along the motion trajectory 613 over the TD 633. Accordingly, an encoded motion vector 635, a reference block 631, and a residual including the difference between the current block 611 and the reference block 631 provides information sufficient to reconstruct a current block 611 and position the current block 611 in the current frame 610.

Figure 7:
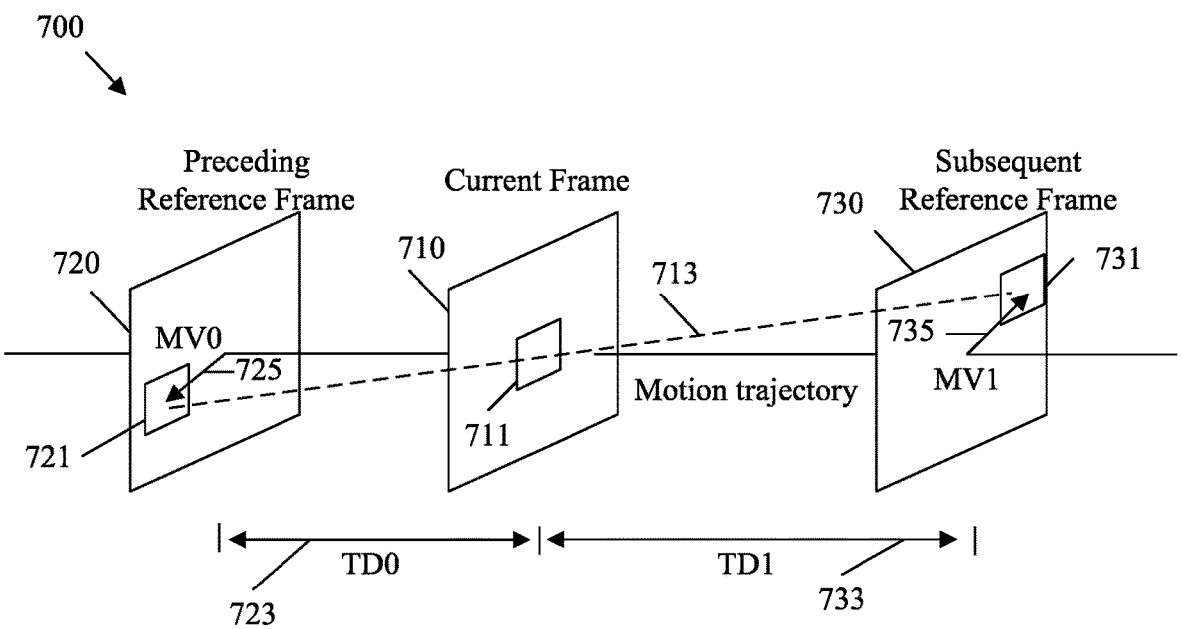
FIG. 7 is a schematic diagram illustrating an example of bidirectional inter prediction.

FIG. 7 is a schematic diagram illustrating an example of bidirectional inter prediction 700. Bidirectional inter prediction 700 can be employed to determine motion vectors for encoded and/or decoded blocks created when partitioning a picture.

Bidirectional inter prediction 700 is similar to unidirectional inter prediction 600, but employs a pair of reference frames to predict a current block 711 in a current frame 710. Hence current frame 710 and current block 711 are substantially similar to current frame 610 and current block 611, respectively. The current frame 710 is temporally positioned between a preceding reference frame 720, which occurs before the current frame 710 in the video sequence, and a subsequent reference frame 730, which occurs after the current frame 710 in the video sequence. Preceding reference frame 720 and subsequent reference frame 730 are otherwise substantially similar to reference frame 630.

The current block 711 is matched to a preceding reference block 721 in the preceding reference frame 720 and to a subsequent reference block 731 in the subsequent reference frame 730. Such a match indicates that, over the course of the video sequence, an object moves from a position at the preceding reference block 721 to a position at the subsequent reference block 731 along a motion trajectory 713 and via the current block 711. The current frame 710 is separated from the preceding reference frame 720 by some preceding temporal distance (TD0) 723 and separated from the subsequent reference frame 730 by some subsequent temporal distance (TD1) 733. The TD0 723 indicates an amount of time between the preceding reference frame 720 and the current frame 710 in the video sequence in units of frames. The TD1 733 indicates an amount of time between the current frame 710 and the subsequent reference frame 730 in the video sequence in units of frame. Hence, the object moves from the preceding reference block 721 to the current block 711 along the motion trajectory 713 over a time period indicated by TD0 723. The object also moves from the current block 711 to the subsequent reference block 731 along the motion trajectory 713 over a time period indicated by TD1 733. The prediction information for the current block 711 may reference the preceding reference frame 720 and/or preceding reference block 721 and the subsequent reference frame 730 and/or subsequent reference block 731 by a pair of reference indices indicating the direction and temporal distance between the frames.

A preceding motion vector (MV0) 725 describes the direction and magnitude of the movement of the object along the motion trajectory 713 over the TD0 723 (e.g., between the preceding reference frame 720 and the current frame 710). A subsequent motion vector (MV1) 735 describes the direction and magnitude of the movement of the object along the motion trajectory 713 over the TD1 733 (e.g., between the current frame 710 and the subsequent reference frame 730). As such, in bidirectional inter prediction 700, the current block 711 can be coded and reconstructed by employing the preceding reference block 721 and/or the subsequent reference block 731, MV0 725, and MV1 735.

In an embodiment, inter prediction and/or bidirectional inter prediction may be carried out on a sample-by-sample (e.g., pixel-by-pixel) basis instead of on a block-by-block basis. That is, a motion vector pointing to each sample in the preceding reference block 721 and/or the subsequent reference block 731 can be determined for each sample in the current block 711. In such embodiments, the motion vector 725 and the motion vector 735 depicted in FIG. 7 represent a plurality of motion vectors corresponding to the plurality of samples in the current block 711, the preceding reference block 721, and the subsequent reference block 731.

In both merge mode and advanced motion vector prediction (AMVP) mode, a candidate list is generated by adding candidate motion vectors to a candidate list in an order defined by a candidate list determination pattern. Such candidate motion vectors may include motion vectors according to unidirectional inter prediction 600, bidirectional inter prediction 700, or combinations thereof. Specifically, motion vectors are generated for neighboring blocks when such blocks are encoded. Such motion vectors are added to a candidate list for the current block, and the motion vector for the current block is selected from the candidate list. The motion vector can then be signaled as the index of the selected motion vector in the candidate list. The decoder can construct the candidate list using the same process as the encoder, and can determine the selected motion vector from the candidate list based on the signaled index. Hence, the candidate motion vectors include motion vectors generated according to unidirectional inter prediction 600 and/or bidirectional inter prediction 700, depending on which approach is used when such neighboring blocks are encoded.

Figure 8:
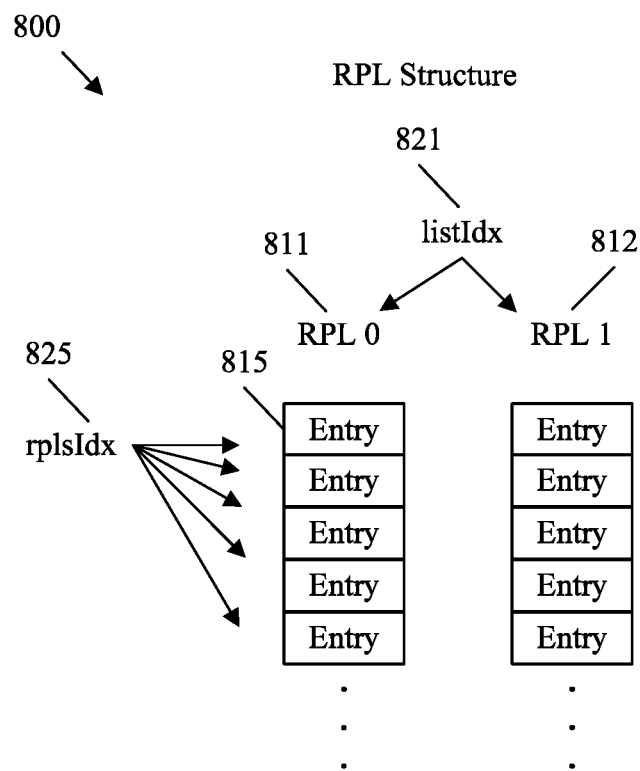
FIG. 8 is a schematic diagram illustrating an example reference picture list structure.

FIG. 8 is a schematic diagram illustrating an example reference picture list structure 800. A reference picture list structure 800 can be employed to store indications of reference pictures and/or inter-layer reference pictures used in unidirectional inter-prediction 600 and/or bidirectional inter-prediction 700. Hence, the reference picture list structure 800 can be employed by a codec system 200, an encoder 300, and/or a decoder 400 when performing method 100.

Reference picture list structure 800, which is also known as an RPL structure, is an addressable syntax structure that contains multiple reference picture lists, such as RPL 0 811 and RPL 1 812. The reference picture list structure 800 may be stored in a SPS, a picture header, and/or a slice header of a bitstream, depending on the example. A reference picture list, such as RPL 0 811 and RPL 1 812, is a list of reference pictures used for inter-prediction and/or inter-layer prediction. Specifically, reference pictures used by unidirectional inter prediction 600 are stored in RPL 0 811 and reference pictures used by bidirectional inter prediction 700 are stored in both RPL 0 811 and RPL 1 812. For example, bidirectional inter prediction 700 may use one reference picture from RPL 0 811 and one reference picture from RPL 1 812. RPL 0 811 and RPL 1 812 may each include a plurality of entries 815. A reference picture list structure entry 815 is an addressable location in a reference picture list structure 800 that indicates a reference picture associated with a reference picture list, such as RPL 0 811 and/or RPL 1 812.

In a specific example, the reference picture list structure 800 can be denoted as ref_pic_list_struct(listIdx, rplsIdx) where listIdx 821 identifies a reference picture list RPL 0 811 and/or RPL 1 812 and rplsIdx 825 identifies an entry 815 in the reference picture list. Accordingly, ref_pic_list_struct is a syntax structure that returns the entry 815 based on listIdx 821 and rplsIdx 825. An encoder can encode a portion of the reference picture list structure 800 for each non-intra-coded slice in a video sequence. A decoder can then resolve the corresponding portion of the reference picture list structure 800 before decoding each non-intra-coded slice in a coded video sequence. In an embodiment, the reference picture lists discussed herein are coded, constructed, derived, or otherwise obtained by the encoder or decoder using information stored in the encoder or decoder, obtained at least in part from the bitstream, and so on.

Figure 9:
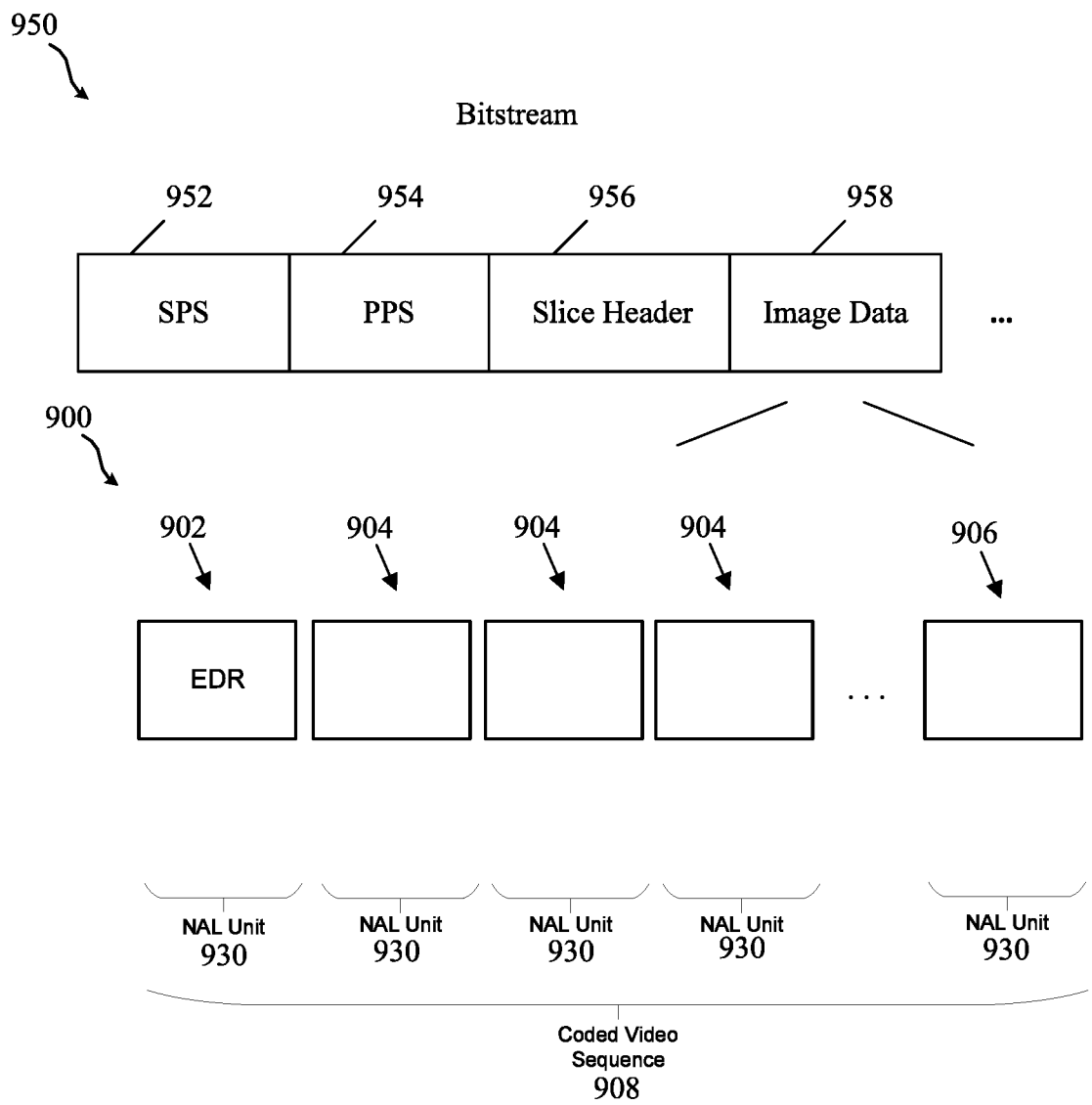
FIG. 9 illustrates a video bitstream configured to implement an external decoding refresh (EDR) technique.

FIG. 9 illustrates a video bitstream 950 configured to implement an external decoding refresh (EDR) technique 900. As used herein the video bitstream 950 may also be referred to as a coded video bitstream, a bitstream, or variations thereof. As shown in FIG. 9, the bitstream 950 comprises a sequence parameter set (SPS) 952, a picture parameter set (PPS) 954, a slice header 956, and image data 958.

The SPS 952 contains data that is common to all the pictures in a sequence of pictures (SOP). In contrast, the PPS 954 contains data that is common to the entire picture. The slice header 956 contains information about the current slice such as, for example, the slice type, which of the reference pictures will be used, and so on. The SPS 952 and the PPS 954 may be generically referred to as a parameter set. The SPS 952, the PPS 954, and the slice header 956 are types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important header data that can apply to a large number of VCL NAL units) and supplemental enhancement information (timing information and other supplemental data that may enhance usability of the decoded video signal but are not necessary for decoding the values of the samples in the video pictures). Those skilled in the art will appreciate that the bitstream 950 may contain other parameters and information in practical applications.

The image data 958 of FIG. 9 comprises data associated with the images or video being encoded or decoded. The image data 958 may be simply referred to as the payload or data being carried in the bitstream 950. In an embodiment, the image data 958 comprises the CVS 908 (or CLVS) containing an EDR picture 902, one or more trailing pictures 904, and an end of sequence picture 906. In an embodiment, the EDR picture 902 is referred to as a CVS starting (CVSS) picture. The CVS 908 is a coded video sequence for every coded layer video sequence (CLVS) in the video bitstream 950. Notably, the CVS and the CLVS are the same when the video bitstream 950 includes a single layer. The CVS and the CLVS are only different when the video bitstream 950 includes multiple layers.

The CVS 908 is a series of pictures (or portions thereof) starting with the EDR picture 902 and includes all pictures (or portions thereof) up to, but not including, the next EDR picture or until the end of the bitstream. In an embodiment, a decoding order begins with the EDR picture 902, continues with the trailing pictures 904, and then proceeds to the end of sequence picture 906.

External decoding refresh (EDR), which is also referred to as cross RAP reference (CRR), allows random access point pictures, such as EDR picture 902, to be inter coded instead of intra coded. The basic idea of the EDR approach is as follows. Instead of coding the EDR picture 902 as an intra-coded intra random access point (IRAP) picture, the EDR picture 902 is coded using inter prediction using earlier pictures (a.k.a., external pictures) provided by way of a second or separate video bitstream, which will be more fully discussed below. Consequently, each earlier picture can be used for inter prediction referencing by pictures across the random access points. The coding efficiency gain comes from inter coding of the random access points.

As shown in FIG. 9, slices of the EDR picture 902, the trailing pictures 904, and the end of sequence picture 906 in the CVS 908 are each contained within their own VCL NAL unit 930. The set of VCL NAL units 930 in the CVS 908 may be referred to as an access unit.

Figure 10:
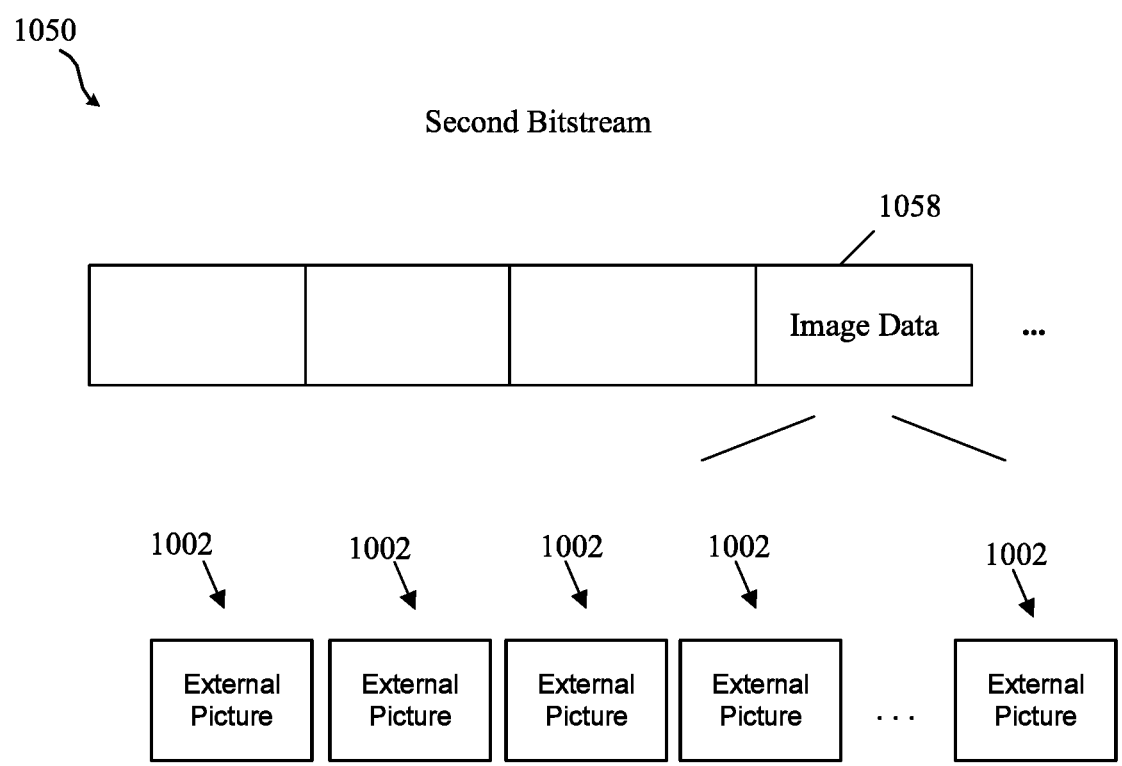
FIG. 10 illustrates a second video bitstream configured to carry image data comprising external pictures.

FIG. 10 illustrates a second video bitstream 1050 configured to carry image data 1058 comprising external pictures 1002. In an embodiment, the second bitstream 1050 may be similar to the bitstream 950 in FIG. 9. Therefore, a full description of the second bitstream 1050 is intentionally omitted for the sake of brevity. In an embodiment, the second video bitstream 1050 is separate from the video bitstream 950 in FIG. 9. In an embodiment, the second video bitstream 1050 may be transmitted and/or received at different times or separately from the bitstream 950. To distinguish the second video bitstream 1050 from the video bitstream 950 in FIG. 9, the second video bitstream 1050 may be referred to as a separate video bitstream, an external video bitstream, or a secondary video bitstream.

The external pictures 1002 carried in the second video bitstream 1050 may be referred to as earlier pictures. In an embodiment, the external pictures 1002 are pictures that were decoded or encountered prior to the process of decoding the EDR picture 902 in FIG. 9. In an embodiment, one or more of the external pictures 1002 is another EDR picture. That is, one or more of the external pictures 1002 in FIG. 10 may be an EDR picture other than the EDR picture 902 in FIG. 9. In an embodiment, one or more of the external pictures 1002 are IRAP pictures. As noted above, one of the external pictures 1002 in FIG. 10 may be used as a reference picture to inter code or inter predict the EDR picture 902 in FIG. 9 as described herein.

Figure 11:
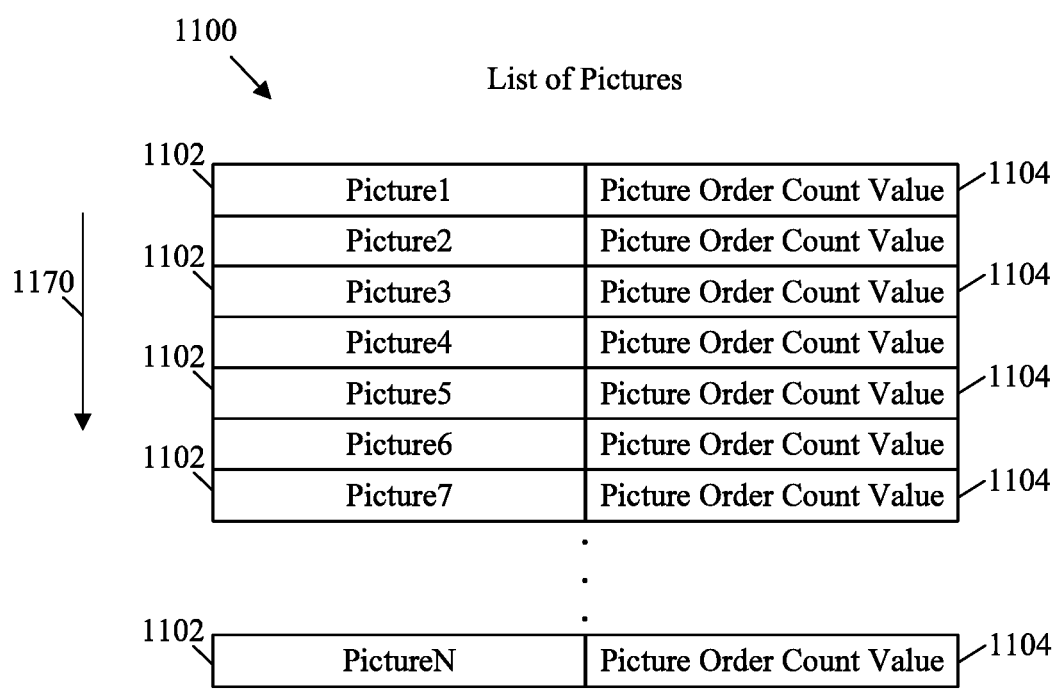
FIG. 11 is an embodiment of a list of pictures that may be utilized to code an EDR picture.

FIG. 11 is an embodiment of a list of pictures 1100 that may be utilized to code an EDR picture (EDR picture 902) using one of the external pictures 1002 of FIG. 10. In an embodiment, the list of pictures 1100 is signaled in a slice header (e.g., slice header 956) of the bitstream. As shown in FIG. 11, the list of pictures 1100 lists a plurality of pictures 1102 in increasing decoding order 1170. In an embodiment, the pictures 1102 lists pictures referred to by entries (e.g., entries 815) in a first reference picture list (e.g., RPL 0 811), entries (e.g., entries 815) in a second reference picture list (e.g., RPL 1 812), and external pictures (e.g., the external pictures 1002). In FIG. 11, the pictures 1102 have been denoted Picture1 to Picture N, where N is any integer. Each of the pictures 1102 has a corresponding picture order count value 1104. In an embodiment, the picture order count values 1104 are picture order count (POC) least significant bits (LSBs).

In the list of pictures 1100, a difference between the picture order count values of any two consecutive pictures (e.g., between Picture 1 and Picture 2, between Picture 3 and Picture 4, etc.) is within a specified or predetermined range. In an embodiment, the difference between the picture order count values of any two consecutive pictures is within a negative of maximum picture order count least significant bits and less than one half of the maximum picture order count least significant bits. That is, the difference is between:
−MaxPicOrderCntLsb/2 and less than MaxPicOrderCntLsb/2.
where the MaxPicOrderCountLsb represents the maximum picture order count LSB.

In an embodiment, for each EDR picture in the bitstream, there shall be zero long term reference picture (LTRP) entries in RefPicList[0] and zero LTRP entries in RefPicList[1].

With either of the above constraints, the POC MSB values of the external pictures and the EDR picture itself can be avoided, at the cost of the need of more bits for signaling of the POC LSBs in each slice header, to enable either of the constraints to be complied, while still allowing the distance in POC between an external picture and the EDR picture to be far away enough for high coding efficiency.

The following decoding process is specified when random accessing from an EDR picture.

A number of access units, where the number is greater than 0, each containing an external picture provided for the EDR picture by an external means are placed before the EDR picture, such that the bitstream BitstreamToDecode comprises the external pictures, the EDR picture, and all the pictures that follow the EDR picture in decoding order. The decoding order of the external pictures in BitstreamToDecode shall be in the order as they are provided by the external means. The following constraints shall apply for each external picture.

The VCL NAL units of each external picture shall not be equal to RASL_NUT or RADL_NUT.

Each external picture shall have TemporalId equal to 0 and non_reference_picture_flag equal to 0.

Optionally, each external picture is intra coded, i.e., it shall not refer to any pictures other than itself for inter prediction in its decoding process. Alternatively, only the first external picture is intra coded. An external picture that is not an intra coded picture shall only refer to other external pictures for the same EDR picture that precede it in decoding order.

The bitstream BitstreamToDecode is decoded, picture by picture, wherein the first picture in BitstreamToDecode is considered as a CLVSS picture and the first non-external picture (i.e., the EDR picture) in BitstreamToDecode is considered as a non-CLVSS picture, and the decoding of each picture is specified as follows.

The decoding of NAL units is specified in clause 8.2 of the current VVC specification.

The processes in clause 8.3 of the current VVC specification specify the following decoding processes using syntax elements in the slice header layer and above.

Variables and functions relating to picture order count are derived as specified in clause 8.3.1 of the current VVC specification. This needs to be invoked only for the first slice of a picture.

At the beginning of the decoding process for each slice of a non-IDR picture, the decoding process for reference picture lists construction specified in clause 8.3.2 of the current VVC specification is invoked for derivation of reference picture list 0 (RefPicList[0]) and reference picture list 1 (RefPicList[1]).

The decoding process for reference picture marking in clause 8.3.3 of the current VVC specification is invoked, wherein reference pictures may be marked as "unused for reference" or "used for long-term reference". This needs to be invoked only for the first slice of a picture.

When the current picture is a CRA picture with NoIncorrectPicOutputFlag equal to 1 or GDR picture with NoIncorrectPicOutputFlag equal to 1, the decoding process for generating unavailable reference pictures specified in sub-clause 8.3.4 of the current VVC specification is invoked, which needs to be invoked only for the first slice of a picture.

PictureOutputFlag is set as follows.

If one of the following conditions is true, PictureOutputFlag is set equal to 0:

The current picture is a RASL picture and NoIncorrectPicOutputFlag of the associated IRAP or EDR picture is equal to 1.

The current picture is an external picture.

gdr_enabled_flag is equal to 1 and the current picture is a GDR picture with NoIncorrectPicOutputFlag equal to 1.

gdr_enabled_flag is equal to 1, the current picture is associated with a GDR picture with NoIncorrectPicOutputFlag equal to 1, and PicOrderCntVal of the current picture is less than RpPicOrderCntVal of the associated GDR picture.

vps_output_layer_mode is equal to 0 and the current access unit contains a picture that has pic_output_flag_equal to 1, has nuh_layer_id nuhLid greater than that of the current picture, and belongs to an output layer (i.e., OutputLayerFlag[GeneralLayerIdx[nuhLid]] is equal to 1).

vps_output_layer_mode is equal to 2 and OutputLayerFlag[GeneralLayerIdx[nuh_layer_id]] is equal to 0.

Otherwise, PictureOutputFlag is set equal to pic_output_flag.

The processes in clauses 8.4, 8.5, 8.6, 8.7 and 8.8 of the current VVC specification specify decoding processes using syntax elements in all syntax structure layers. It is a requirement of bitstream conformance that the coded slices of the picture shall contain slice data for every CTU of the picture, such that the division of the picture into slices, and the division of the slices into CTUs each forms a partitioning of the picture.

After all slices of the current picture have been decoded, the current decoded picture is marked as "used for short-term reference," and each ILRP entry in RefPicList[0] or RefPicList[1] is marked as "used for short-term reference."

A buffering period SEI message is allowed be present for an EDR access unit, such that the hypothetical reference decoder (HRD) conformance can be specified for bitstreams starting with an EDR access unit.

Figure 12:
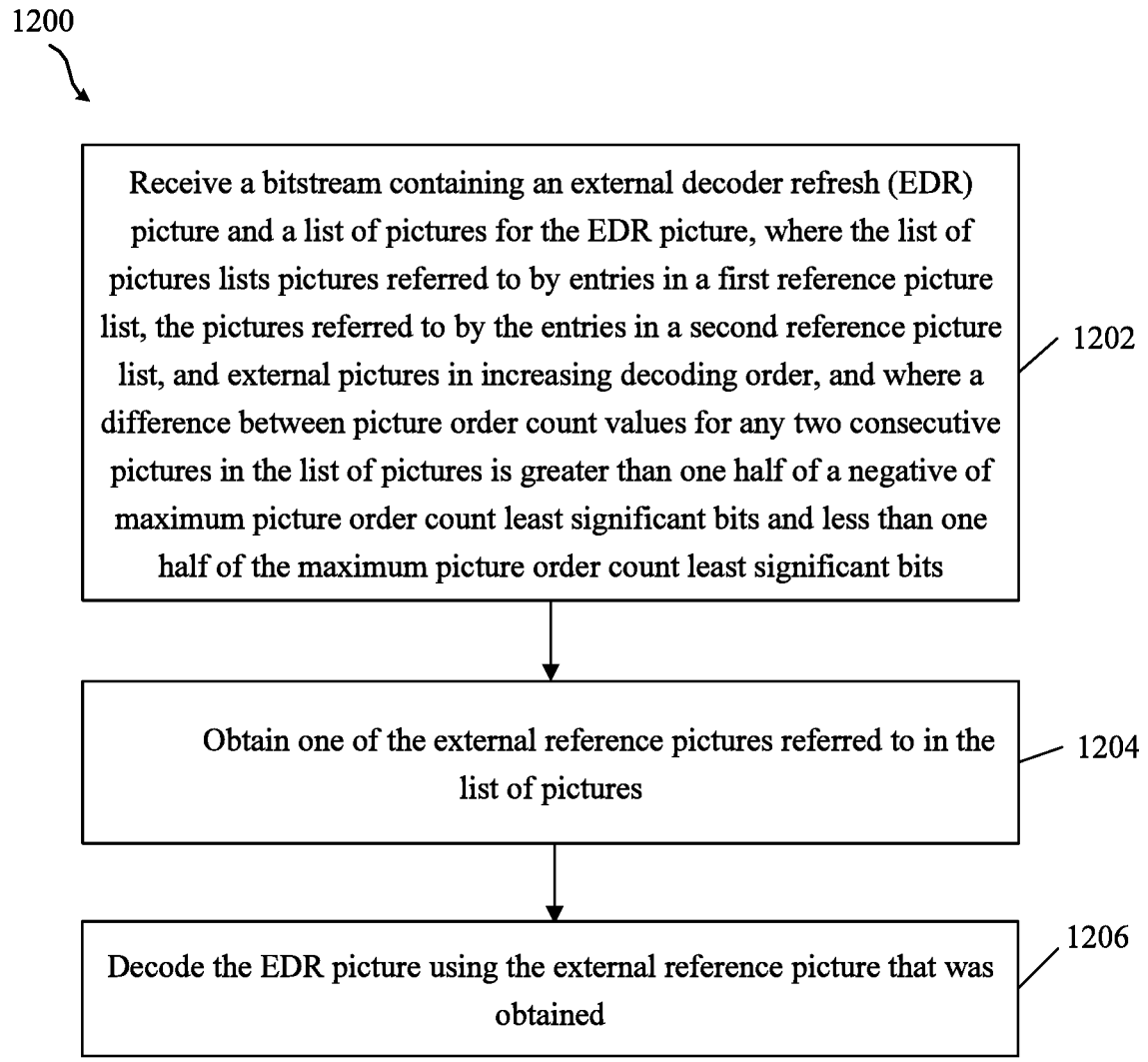
FIG. 12 is an embodiment of a method of decoding a coded video bitstream.

FIG. 12 is an embodiment of a method 1200 of decoding implemented by a video decoder (e.g., video decoder 400). The method 1200 may be performed after the decoded bitstream has been directly or indirectly received from a video encoder (e.g., video encoder 300). The method 1200 improves the decoding process by restricting a difference between the picture order count values for any two consecutive pictures in a list of pictures to a limited range when providing random access using an external decoder refresh (EDR) picture. By restricting the difference between picture order count values for any two consecutive pictures in a list of pictures to the limited range, the number of bits needed for signaling the picture order count values is reduced, which improves coding efficiency. Therefore, as a practical matter, the performance of a codec is improved, which leads to a better user experience.

In block 1202, the video decoder receives a bitstream containing an external decoder refresh (EDR) picture and a list of pictures for the EDR picture. The list of pictures lists pictures referred to by entries in a first reference picture list, the pictures referred to by the entries in a second reference picture list, and external pictures in increasing decoding order. A difference between picture order count values for any two consecutive pictures in the list of pictures is greater than one half of a negative of maximum picture order count least significant bits and less than one half of the maximum picture order count least significant bits.

In an embodiment, one of the external pictures is a reference EDR picture. In an embodiment, one of the external pictures is a reference intra random access point (IRAP) picture. In an embodiment, the picture order count values are picture order count (POC) least significant bits (LSBs). In an embodiment, the list of pictures containing the picture order count values are signaled in a slice header of the bitstream. However, the list of pictures may be included elsewhere in the bitstream in other embodiments.

In block 1204, the video decoder obtains one of the external pictures referred to in the list of pictures. In an embodiment, the external picture 1102 is obtained from the second bitstream 1050.

In block 1206, the video decoder decodes the EDR picture using the external reference picture that was obtained. In an embodiment, an image generated based on the EDR picture is displayed for a user of an electronic device (e.g., a smart phone, tablet, laptop, personal computer, etc.).

Figure 13:
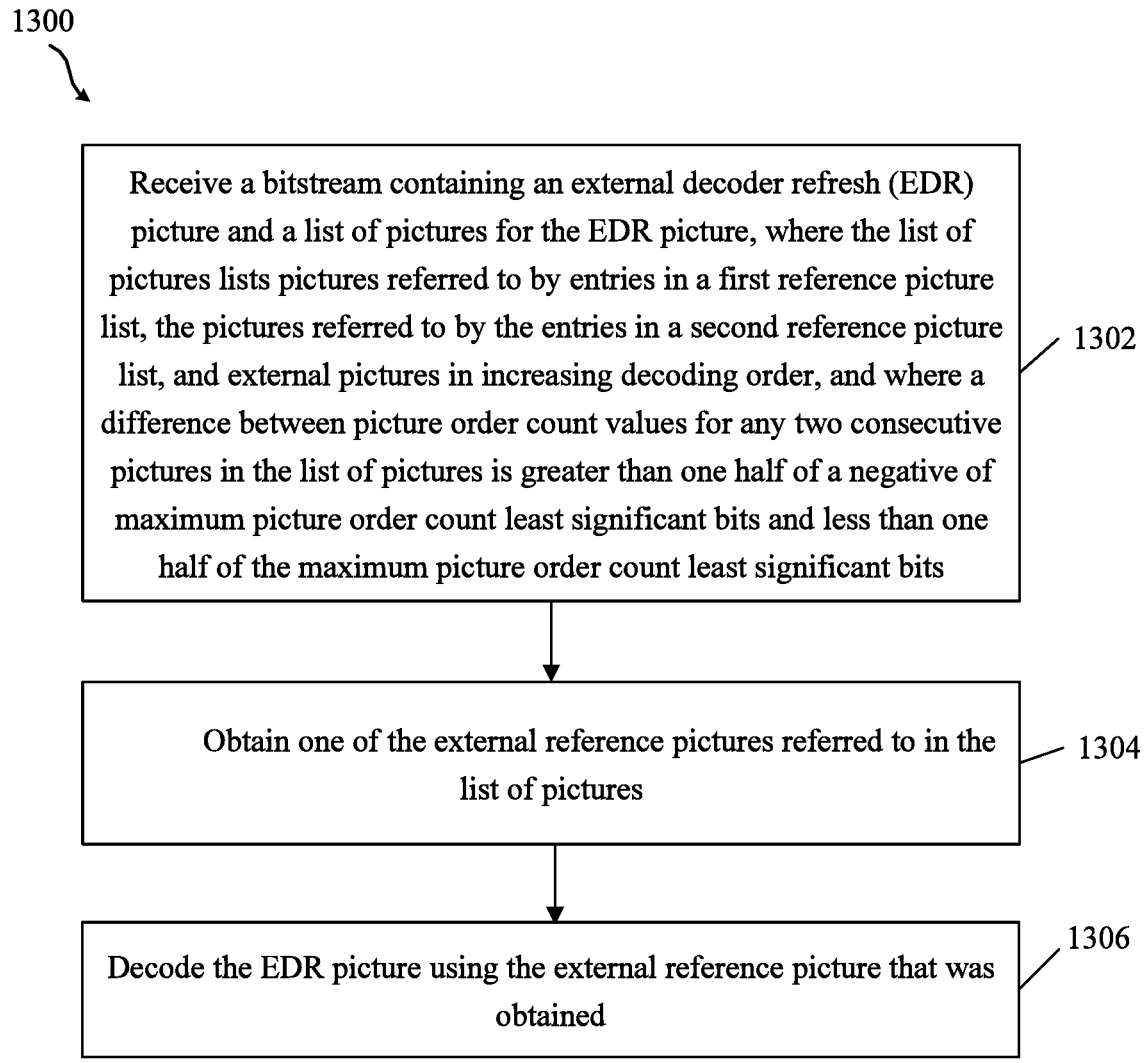
FIG. 13 is an embodiment of a method of encoding a coded video bitstream.

FIG. 13 is an embodiment of a method 1300 of encoding implemented by a video encoder (e.g., video encoder 300). The method 1300 may be performed when a picture (e.g., from a video) is to be encoded into a video bitstream and then transmitted toward a video decoder (e.g., video decoder 400). The method 1300 improves the encoding process by restricting a difference between the picture order count values for any two consecutive pictures in a list of pictures to a limited range when providing random access using an external decoder refresh (EDR) picture. By restricting the difference between picture order count values for any two consecutive pictures in a list of pictures to the limited range, the number of bits needed for signaling the picture order count values is reduced, which improves coding efficiency. Therefore, as a practical matter, the performance of a codec is improved, which leads to a better user experience.

In block 1302, the video encoder generates an external decoder refresh (EDR) picture and a list of pictures for the EDR picture. The list of pictures lists pictures referred to by entries in a first reference picture list, the pictures referred to by the entries in a second reference picture list, and external pictures in increasing decoding order. A difference between picture order count values for any two consecutive pictures in the list of pictures is greater than one half of a negative of maximum picture order count least significant bits and less than one half of the maximum picture order count least significant bits.

In an embodiment, one of the external pictures is a reference EDR picture. In an embodiment, one of the external pictures is a reference intra random access point (IRAP) picture. In an embodiment, the picture order count values are picture order count (POC) least significant bits (LSBs).

In block 1304, the video encoder encodes the EDR picture and the list of pictures for the EDR picture into a bitstream. In an embodiment, the list of pictures containing the picture order count values are encoded in a slice header of the bitstream. However, the list of pictures may be encoded elsewhere in the bitstream in other embodiments.

In block 1306, the video encoder stores the video bitstream for transmission toward the video decoder. In an embodiment, the video coder transmits the video bitstream toward the video decoder.

The following syntax and semantics may be employed to implement the embodiments disclosed herein. The following description is relative to the basis text, which is the latest VVC draft specification. In other words, only the delta is described, while the text in the basis text that are not mentioned below apply as they are. Updated text relative to the basis text is shown in italics.

Definitions are provided.

associated EDR picture (of a particular picture): The previous EDR picture in decoding order (when present) of for which there is no IRAP picture between the EDR picture and the particular picture in decoding order.

associated IRAP picture (of a particular picture): The previous IRAP picture in decoding order (when present) for which there is no EDR picture between the IRAP picture and the particular picture in decoding order.

coded layer video sequence (CLVS): A sequence of layer access units that consists, in decoding order, of a CLVSS layer access unit, followed by zero or more layer access units that are not CLVSS layer access units, including all subsequent layer access units up to but not including any subsequent layer access unit that is a CLVSS layer access unit.

NOTE—A CLVSS layer access unit may be an IDR layer access unit, a CRA layer access unit, an EDR layer access unit, or a GDR layer access unit. The value of NoIncorrectPicOutputFlag is equal to 1 for each IDR layer access unit, and each CRA layer access unit that has HandleCraAsCvsStartFlag equal to 1, and each CRA, EDR, or GDR layer access unit that is the first layer access unit in the layer of the bitstream in decoding order or the first layer access unit in the layer of the bitstream that follows an end of sequence NAL unit in decoding order.

coded layer video sequence start (CLVSS) picture: A coded picture that is an IRAP picture with NoIncorrectPicOutputFlag equal to 1, an EDR picture with NoIncorrectPicOutputFlag equal to 1, or a GDR picture with NoIncorrectPicOutputFlag equal to 1.

external decoding refresh (EDR) layer access unit: An access unit in which the coded picture in each present layer access unit is an EDR picture.

external decoding refresh (EDR) layer access unit: A layer access unit in which the coded picture is an EDR picture.

external decoding refresh (EDR) picture: A picture for which each VCL NAL unit has NalUnitType equal to EDR NUT.

NOTE 1—When random accessing from an EDR picture (i.e., without performing the decoding process of any pictures in the bitstream that precede the EDR picture in decoding order, thus the EDR picture is the first in "the bitstream"), provided the necessary parameter sets and external pictures are available when they are needed, the EDR picture and all subsequent non-RASL pictures in the CVS in decoding order can be correctly decoded.

NOTE 2—For an EDR picture in a CVS that is not the first picture of the CVS in decoding order, the external pictures that need to be provided for the EDR picture when random accessing from the EDR picture are pictures in the CVS that precede the EDR picture in decoding order. Therefore, when random accessing from an IRAP or EDR picture preceding the EDR picture in decoding order (i.e., continuous decoding of the EDR picture), no external pictures need to be provided for correct decoding of the particular EDR picture and all subsequent non-RASL pictures in the CVS in decoding order.

external picture: A picture provided for an EDR picture by an external means not specified in this Specification.

NOTE—External pictures are not output by the decoder; they are for inter prediction referencing only.

intra random access point (IRAP) picture: A coded picture for which each VCL NAL unit has nal_unit_type in the range of IDR_W_RADL to CRA_NUT, inclusive.

NOTE—An IRAP picture does not refer to any pictures other than itself for inter prediction in its decoding process, and may be a CRA picture or an IDR picture. The first picture in the bitstream in decoding order must be an IRAP, EDR, or GDR picture. Provided the necessary parameter sets are available when they need to be referred, the IRAP picture and all subsequent non-RASL pictures in the CVS in decoding order can be correctly decoded without performing the decoding process of any pictures that precede the IRAP picture in decoding order. [Ed. (GJS) Cleanup "referred" throughout.]

leading picture: A picture associated with an IRAP picture or an EDR picture that that is in the same layer as the associated IRAP picture and precedes the associated IRAP picture or the associated EDR picture in output order.

random access decodable leading (RADL) picture: A coded picture for which each VCL NAL unit has nal_unit_type equal to RADL_NUT.

NOTE—All RADL pictures are leading pictures. RADL pictures are not used as reference pictures for the decoding process of trailing pictures of the same associated IRAP or EDR picture. When present, all RADL pictures precede, in decoding order, all trailing pictures of the same associated IRAP or EDR picture.

random access skipped leading (RASL) picture: A coded picture for which each VCL NAL unit has nal_unit_type equal to RASL_NUT.

NOTE—All RASL pictures are leading pictures of an associated CRA or EDR picture. When the associated CRA or EDR picture has NoIncorrectPicOutputFlag equal to 1, the RASL picture is not output and may not be correctly decodable, as the RASL picture may contain references to pictures that are not present in the bitstream. RASL pictures are not used as reference pictures for the decoding process of non-RASL pictures. When present, all RASL pictures precede, in decoding order, all trailing pictures of the same associated CRA or EDR picture.

trailing picture: A non-IRAP, non-EDR picture that follows the associated IRAP or EDR picture in output order and that is not an STSA picture.

NOTE—Trailing pictures associated with an IRAP or EDR picture also follow the IRAP or EDR picture in decoding order. Pictures that follow the associated IRAP or EDR picture in output order and precede the associated IRAP or EDR picture in decoding order are not allowed.

The sequence parameter set RBSP syntax is provided.

|  | Descriptor |
|---|---|
| seq_parameter_set_rbsp( ) { |  |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) |  |
|   sps_edr_pic_present_flag | u(1) |
|   gdr_enabled_flag | u(1) |
|   sps_seq_parameter_set_id | ue(v) |
| ... |  |

The general slice header syntax is provided.

|  | Descriptor |
|---|---|
| slice_header( ) { |  |
|   slice_pic_parameter_set_id | ue(v) |
|   if( rect_slice_flag \|\| NumBricksInPic > 1 ) |  |
|     slice_address | u(v) |
|   if( !rect_slice_flag && !single_brick_per_slice_flag ) |  |
|     num_bricks_in_slice_minus1 | ue(v) |
|   non_reference_picture_flag | u(1) |
|   slice_type | ue(v) |
|   if( separate_colour_plane_flag == 1 ) |  |
|     colour_plane_id | u(2) |
|   slice_pic_order_cnt_lsb | u(v) |
|   if( nal_unit_type == GDR_NUT ) |  |
|     recovery_poc_cnt | ue(v) |
|   if( nal_unit_type == IDR_W_RADL \|\| nal_unit type == IDR_N_LP |  |
|     \|\| |  |
|     nal_unit_type == CRA_NUT \|\| NalUnitType == EDR_NUT \|\| |  |
|     NalUnitType == GDR_NUT ) |  |

-continued

| | Descriptor |
|---|---|
| no_output_of_prior_pics_flag | u(1) |
| if( output_flag_present_flag ) | |
|     pic_output_flag | u(1) |
| ... | |

NAL unit header semantics are provided.

TABLE 7-1

NAL unit type codes and NAL unit type classes

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RASL_NUT | Coded slice of a RASL picture slice_layer_rbsp( ) | VCL |
| 3 | RADL_NUT | Coded slice of a RADL picture slice_layer_rbsp( ) | VCL |
| 4 ... 7 | RSV_VCL_4 ... RSV_VCL_7 | Reserved non-IRAP VCL NAL unit types | VCL |
| 8 | IDR_W_RADL | Coded slice of an IDR picture slice_layer_rbsp( ) | VCL |
| 9 | IDR_N_LP | | |
| 10 | CRA_NUT | Coded slice of a CRA picture silce_layer_rbsp( ) | VCL |
| 11 | RSV_IRAP_VCL11 | Reserved IRAP VCL NAL unit type | VCL |
| 12 | EDR_NUT | Coded slice of an EDR picture slice_layer_rbsp( ) | VCL |
| 13 | GDR_NUT | Coded slice of a GDR picture slice_layer_rbsp( ) | VCL |
| 14 ... 15 | RSV_VCL14 ... RSV_VCL15 | Reserved non-IRAP VCL NAL unit types | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | APS_NUT | Adaptation parameter set adaptation_parameter_set_rbsp( ) | non-VCL |
| 19 | AUD_NUT | Access unit delimiter access_unit_delimiter_rbsp( ) | non-VCL |
| 20 | EOS_NUT | End of sequence end_of_seq_rbsp( ) | non-VCL |
| 21 | EOB_NUT | End of bitstream end_of_bitstream_rbsp( ) | non-VCL |
| 22, 23 | PREFIX_SEI_NUT SUFFIX_SEI_NUT | Supplemental enhancement information sei_rbsp( ) | non-VCL |
| 24 | DPS_NUT | Decoding parameter set decoding_parameter_set_rbsp( ) | non-VCL |
| 25 ... 27 | RSV_NVCL25 ... RSV_NVCL27 | Reserved non-VCL NAL unit types | non-VCL |
| 28 ... 31 | UNSPEC28 ... UNSPEC31 | Unspecified non-VCL NAL unit types | non-VCL |

NOTE 3—A clean random access (CRA) picture may have associated RASL or RADL pictures present in the bitstream.

NOTE 4—An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

NOTE 5—An external decoding refresh (EDR) picture may have associated RASL or RADL pictures present in the bitstream.

The value of nal_unit_type shall be the same for all coded slice NAL units of a picture. A picture or a layer access unit is referred to as having the same NAL unit type as the coded slice NAL units of the picture or layer access unit.

For a single-layer bitstream, the following constraints apply:

- Each picture, other than the first picture in the bitstream in decoding order, is considered to be associated with the previous IRAP or EDR picture in decoding order.
- When a picture is a leading picture of an IRAP or EDR picture, it shall be a RADL or RASL picture.
- When a picture is a trailing picture of an IRAP or EDR picture, it shall not be a RADL or RASL picture.
- No RASL pictures shall be present in the bitstream that are associated with an IDR picture.

No RADL pictures shall be present in the bitstream that are associated with an IDR picture having nal_unit_type equal to IDR_N_LP.

NOTE—It is possible to perform random access at the position of an IRAP access unit by discarding all access units before the IRAP access unit (and to correctly decode the IRAP picture and all the subsequent non-RASL pictures in decoding order), provided each parameter set is available (either in the bitstream or by external means not specified in this Specification) when it is referred.

Any picture that precedes an IRAP or EDR picture in decoding order shall precede the IRAP or EDR picture in output order and shall precede any RADL picture associated with the IRAP or EDR picture in output order.

Any RASL picture associated with a CRA or EDR picture shall precede any RADL picture associated with the CRA or EDR picture in output order.

Any RASL picture associated with a CRA or EDR picture shall follow, in output order, any IRAP or EDR picture that precedes the CRA or EDR picture in decoding order.

If field_seq_flag is equal to 0 and the current picture is a leading picture associated with an IRAP or EDR picture, it shall precede, in decoding order, all non-leading pictures that are associated with the same IRAP or EDR picture. Otherwise, let picA and picB be the first and the last leading pictures, in decoding order, associated with an IRAP or EDR picture, respectively, there shall be at most one non-leading picture preceding picA in decoding order, and there shall be no non-leading picture between picA and picB in decoding order.

For each EDR picture in the bitstream, let listOfPictures be the list of pictures that consists of all the pictures referred to by all entries in RefPicList[0] and all entries in RefPicList[1] of any slice of the EDR picture and the EDR picture itself, listed in increasing decoding order of these pictures, it is a requirement of bitstream conformance that the difference between the PicOrderCntVal values of any two of these pictures that are consecutive in the list shall be greater than—MaxPicOrderCntLsb/2 and less than MaxPicOrderCntLsb/2.

Alternatively to the above constraint, for each EDR picture in the bitstream, there shall be zero LTRP entries in RefPicList[0] and zero LTRP entries in RefPicList[1].

nuh_temporal_id_plus1 minus 1 specifies a temporal identifier for the NAL unit.

The value of nuh_temporal_id_plus1 shall not be equal to 0.

The variable TemporalId is derived as follows.

$$TemporalId = nuh\_temporal\_id\_plus1 - 1 \qquad (7\text{-}1)$$

When nal_unit_type is in the range of IDR_W_RADL to GDR_NUT, inclusive, TemporalId shall be equal to 0.

When nal_unit_type is equal to STSA_NUT, TemporalId shall not be equal to 0.

The value of TemporalId shall be the same for all VCL NAL units of a layer access unit. The value of TemporalId of a coded picture or a layer access unit is the value of the TemporalId of the VCL NAL units of the coded picture or the layer access unit. The value of TemporalId of a sub-layer representation is the greatest value of TemporalId of all VCL NAL units in the sub-layer representation.

The value of TemporalId for non-VCL NAL units is constrained as follows:

If nal_unit_type is equal to DPS_NUT, VPS_NUT, or SPS_NUT, TemporalId is equal to 0 and the TemporalId of the layer access unit containing the NAL unit shall be equal to 0.

Otherwise, when nal_unit_type is not equal to EOS_NUT and not equal to EOB_NUT, TemporalId shall be greater than or equal to the TemporalId of the layer access unit containing the NAL unit.

NOTE 5—When the NAL unit is a non-VCL NAL unit, the value of TemporalId is equal to the minimum value of the TemporalId values of all layer access units to which the non-VCL NAL unit applies. When nal_unit_type is equal to PPS_NUT or APS_NUT, TemporalId may be greater than or equal to the TemporalId of the containing layer access unit, as all PPSs and APSs may be included in the beginning of a bitstream, wherein the first coded picture has TemporalId equal to 0. When nal unit type is equal to PREFIX_SEI_NUT or SUFFIX_SEI_NUT, TemporalId may be greater than or equal to the TemporalId of the containing layer access unit, as an SEI NAL unit may contain information that applies to a bitstream subset that includes layer access units for which the TemporalId values are greater than the TemporalId of the layer access unit containing the SEI NAL unit.

The order of access units and association to CVSs is discussed.

A bitstream conforming to this Specification consists of one or more CVSs.

A CVS consists of one or more access units. The order of NAL units and coded pictures and their association to access units is described in clause 7.4.2.4.3.

The first access unit of a CVS is a CVSS access unit, wherein each present layer access unit is a CLVSS layer access unit, which is either an IRAP layer access unit with NoIncorrectPicOutputFlag equal to 1, an EDR layer access unit with NoIncorrectPicOutputFlag equal to 1, or a GDR layer access unit with NoIncorrectPicOutputFlag equal to 1.

It is a requirement of bitstream conformance that, when present, each layer access unit in the next access unit after an access unit that contains an end of sequence NAL unit or an end of bitstream NAL unit shall be an IRAP layer access unit, which may be an IDR layer access unit or a CRA layer access unit, an EDR layer access unit, or a GDR layer access unit.

The sequence parameter set RBSP semantics are discussed.

sps_edr_pic_present_flag equal to 1 specifies that EDR pictures may be present in CVSs referring to the SPS. sps_edr_pic_present_flag to 0 specifies that there is no EDR pictures present in CVSs referring to the SPS.

gdr_enabled_flag equal to 1 specifies that GDR pictures may be present in CVSs referring to the SPS. gdr_enabled_flag equal to 0 specifies that GDR pictures are not present in CVSs referring to the SPS.

sps_seq_parameter_set_id provides an identifier for the SPS for reference by other syntax elements. The value of sps_seq_parameter_set_id shall be in the range of 0 to 15, inclusive.

The end of sequence RBSP semantics are discussed.

When present, the end of sequence RBSP specifies that the current access unit is the last access unit in the coded video sequence in decoding order and the next subsequent access unit in the bitstream in decoding order (if any) is an IRAP, EDR, or GDR access unit. The syntax content of the SODB and RBSP for the end of sequence RBSP are empty.

The general decoding process is discussed.

Input to this process is a bitstream. Output of this process is a list of decoded pictures.

The decoding process is specified such that all decoders that conform to a specified profile and level will produce numerically identical cropped decoded output pictures when invoking the decoding process associated with that profile for a bitstream conforming to that profile and level. Any decoding process that produces identical cropped decoded output pictures to those produced by the process described herein (with the correct output order or output timing, as specified) conforms to the decoding process requirements of this Specification.

For each IRAP picture in the bitstream, the following applies:
  If the picture is an IDR picture, the first picture in the bitstream in decoding order, or the first picture that follows an end of sequence NAL unit in decoding order, the variable NoIncorrectPicOutputFlag is set equal to 1.
  Otherwise, if some external means not specified in this Specification is available to set the variable HandleCraAsCvsStartFlag to a value for the picture, HandleCraAsCvsStartFlag is set equal to the value provided by the external means and NoIncorrectPicOutputFlag is set equal to HandleCraAsCvsStartFlag.
  Otherwise, HandleCraAsCvsStartFlag and NoIncorrectPicOutputFlag are both set equal to 0.

For each EDR picture in the bitstream, the following applies:
  If the picture is the first picture in the bitstream in decoding order or the first picture that follows an end of sequence NAL unit in decoding order, the variable NoIncorrectPicOutputFlag is set equal to 1.
  Otherwise, NoIncorrectPicOutputFlag is set equal to 0.

For each GDR picture in the bitstream, the following applies:
  If the current picture is the first picture in the bitstream in decoding order or the first picture that follows an end of sequence NAL unit in decoding order, the variable NoIncorrectPicOutputFlag is set equal to 1.
  Otherwise, NoIncorrectPicOutputFlag is set equal to 0.

NOTE—The above operations for IRAP, EDR, and GDR pictures, are needed for identification of the CVSs in the bitstream.

For each CVS in the bitstream, the list TargetLayerIdList, which identifies the list of target layers to be decoded, and the variable HighestTid, which identifies the highest temporal sub-layer to be decoded, are specified as follows:
  If some external means, not specified in this Specification, is available to set TargetLayerIdList, TargetLayerIdList is set by the external means.
  Otherwise, if vps_all_independent_layers_flag is equal to 1, TargetLayerIdList is set to contain only vps_layer_id[0].
  Otherwise, TargetLayerIdList is set to contain vps_layer_id[i] for i in the range of 0 to vps_max_layers_minus1, inclusive.
  If some external means, not specified in this Specification, is available to set HighestTid, HighestTid is set by the external means.
  Otherwise, HighestTid is set equal to sps_max_sub_layers_minus1.

The variable DecodingUnitHrdFlag is specified as follows:
  If the decoding process is invoked in a bitstream conformance test as specified in clause C.1, DecodingUnitHrdFlag is set as specified in clause C.1.
  Otherwise, DecodingUnitHrdFlag is set equal to decoding_unit_hrd_params_present_flag.

For each CVS in the bitsstream, the sub-bitstream extraction process as specified in clause 10 is applied with the CVS, TargetLayerIdList, and HighestTid as inputs, and the output is assigned to a bitstream referred to as CvsToDecode. After that, the instances of CvsToDecode of all the CVSs are concatenated, in decoding order, and the result is assigned to the bitstream BitstreamToDecode.

The variable ExternalPicsProvidedFlag is set equal to 0.

The decoding process for a coded picture is repeatedly invoked for each coded picture in BitstreamToDecode in decoding order.

The decoding process for a coded picture is discussed.

The decoding processes specified in this clause apply to each coded picture, referred to as the current picture and denoted by the variable CurrPic, in BitstreamToDecode.

Depending on the value of chroma_format_idc, the number of sample arrays of the current picture is as follows:
  If chroma_format_idc is equal to 0, the current picture consists of 1 sample array SL.
  Otherwise (chroma_format_idc is not equal to 0), the current picture consists of 3 sample arrays SL, SCb, SCr.

The decoding process for the current picture takes as inputs the syntax elements and upper-case variables from clause 7. When interpreting the semantics of each syntax element in each NAL unit, and in the remaining parts of clause 8, the term "the bitstream" (or part thereof, e.g., a CVS of the bitstream) refers to BitstreamToDecode (or part thereof).

When ExternalPicsProvidedFlag is equal to 0 and the current picture is an EDR picture with NoIncorrectPicOutputFlag equal to 1, the following ordered steps apply:
  1) A number of access units, where the number is greater than 0, each containing an external picture provided for the current picture by an external means not specified in this Specification are placed at the beginning of BitstreamToDecode, such that BitstreamToDecode consists of the external pictures followed by those pictures originally present in BitstreamToDecode. The decoding order of the external pictures in BitstreamToDecode shall be in the order as they are provided by the external means. The following constraints shall apply for each external picture:
    a) The VCL NAL units of each external picture shall not be equal to RASL_NUT or RADL_NUT.
    b) Each external picture shall have TemporalId equal to 0 and non_reference_picture_flag equal to 0.
    c) Optionally, each external picture is required to be intra coded, i.e., it shall not refer to any pictures other than itself for inter prediction in its decoding process.
    i) Alternatively, only the first external picture is required to be intra coded. An external picture that is not an intra coded picture shall only refer to other external pictures for the same EDR picture that precede it in decoding order.
  2) ExternalPicsProvidedFlag is set equal to 1.
  3) The decoding process for a coded picture is repeatedly invoked for each coded picture in BitstreamToDecode in decoding order, wherein during the invocation of the decoding process for picture order count, the decoding process for reference picture lists construction, and the decoding process for reference picture marking, the first picture in BitstreamToDecode (i.e., the first external picture) is considered as a CLVSS picture and the first non-external picture (i.e., the EDR picture) in BitstreamToDecode is considered as a non-CLVSS picture.

Depending on the value of separate colour plane flag, the decoding process is structured as follows:

If separate colour plane flag is equal to 0, the decoding process is invoked a single time with the current picture being the output.

Otherwise (separate_colour_plane_flag is equal to 1), the decoding process is invoked three times. Inputs to the decoding process are all NAL units of the coded picture with identical value of colour_plane_id. The decoding process of NAL units with a particular value of colour_plane_id is specified as if only a CVS with monochrome colour format with that particular value of colour_plane_id would be present in the bitstream. The output of each of the three decoding processes is assigned to one of the 3 sample arrays of the current picture, with the NAL units with colour_plane_id equal to 0, 1 and 2 being assigned to SL, Scb and Scr, respectively.

NOTE—The variable ChromaArrayType is derived as equal to 0 when separate_colour_plane_flag is equal to 1 and chroma_format_idc is equal to 3. In the decoding process, the value of this variable is evaluated resulting in operations identical to that of monochrome pictures (when chroma_format_idc is equal to 0).

The decoding process operates as follows for the current picture CurrPic:

1. The decoding of NAL units is specified in clause 8.2.
2. The processes in clause 8.3 specify the following decoding processes using syntax elements in the slice header layer and above:

Variables and functions relating to picture order count are derived as specified in clause 8.3.1. This needs to be invoked only for the first slice of a picture.

At the beginning of the decoding process for each slice of a non-IDR picture, the decoding process for reference picture lists construction specified in clause 8.3.2 is invoked for derivation of reference picture list 0 (RefPicList[0]) and reference picture list 1 (RefPicList[1]).

The decoding process for reference picture marking in clause 8.3.3 is invoked, wherein reference pictures may be marked as "unused for reference" or "used for long-term reference." This needs to be invoked only for the first slice of a picture.

When the current picture is a CRA picture with NoIncorrectPicOutputFlag equal to 1 or GDR picture with NoIncorrectPicOutputFlag equal to 1, the decoding process for generating unavailable reference pictures specified in subclause 8.3.4 is invoked, which needs to be invoked only for the first slice of a picture.

PictureOutputFlag is set as follows:

If one of the following conditions is true, PictureOutputFlag is set equal to 0:

The current picture is a RASL picture and NoIncorrectPicOutputFlag of the associated IRAP or EDR picture is equal to 1.

The current picture is an external picture.

gdr_enabled_flag is equal to 1 and the current picture is a GDR picture with NoIncorrectPicOutputFlag equal to 1.

gdr_enabled_flag is equal to 1, the current picture is associated with a GDR picture with NoIncorrectPicOutputFlag equal to 1, and PicOrderCntVal of the current picture is less than RpPicOrderCntVal of the associated GDR picture.

vps_output_layer_mode is equal to 0 and the current access unit contains a picture that has pic_output_flag equal to 1, has nuh_layer_id nuhLid greater than that of the current picture, and belongs to an output layer (i.e., OutputLayerFlag[GeneralLayerIdx[nuhLid]] is equal to 1).

vps_output_layer_mode is equal to 2 and OutputLayerFlag[GeneralLayerIdx[nuh_layer_id]] is equal to 0.

Otherwise, PictureOutputFlag is set equal to pic_output_flag.

3. The processes in clauses 8.4, 8.5, 8.6, 8.7 and 8.8 specify decoding processes using syntax elements in all syntax structure layers. It is a requirement of bitstream conformance that the coded slices of the picture shall contain slice data for every CTU of the picture, such that the division of the picture into slices, and the division of the slices into CTUs each forms a partitioning of the picture.
4. After all slices of the current picture have been decoded, the current decoded picture is marked as "used for short-term reference", and each ILRP entry in RefPicList[0] or RefPicList[1] is marked as "used for short-term reference".

When gdr_enabled_flag is equal to 1 and PicOrderCntVal of the current picture is greater than or equal to RpPicOrderCntVal of the previous GDR picture in decoding order for which there is no IRAP picture between the current picture and the previous GDR picture in decoding order, it is a requirement of bitstream conformance that the current and subsequent decoded pictures shall be an exact match to the pictures produced by starting the decoding process at the previous IRAP picture preceding the current picture in decoding order.

The general decoding process for generating unavailable reference pictures is discussed.

This process is invoked once per coded picture when the current picture is a CRA picture with NoIncorrectPicOutputFlag equal to 1, an EDR picture with NoIncorrectPicOutputFlag equal to 1, or a GDR picture with NoIncorrectPicOutputFlag equal to 1.

Bitstream conformance is discussed.

A bitstream of coded data conforming to this Specification shall fulfil all requirements specified in this clause.

The bitstream shall be constructed according to the syntax, semantics and constraints specified in this Specification outside of this annex.

The first coded picture in a bitstream shall be an IRAP picture (i.e., an IDR picture or a CRA picture), an EDR picture, or a GDR picture.

Buffering period SEI message semantics are discussed.

A buffering period SEI message provides initial CPB removal delay and initial CPB removal delay offset information for initialization of the HRD at the position of the associated access unit in decoding order.

When the buffering period SEI message is present, a picture is said to be a notDiscardablePic picture when the picture has TemporalId equal to 0 and is not a RASL or RADL picture.

When the current picture is not the first picture in the bitstream in decoding order, let prevNonDiscardablePic be the preceding picture in decoding order with TemporalId equal to 0 that is not a RASL or RADL picture.

The presence of buffering period SEI messages is specified as follows:
  If NalHrdBpPresentFlag is equal to 1 or VclHrdBpPresentFlag is equal to 1, the following applies for each access unit in the CVS:
    If the access unit is an IRAP, EDR, or GDR access unit, a buffering period SEI message applicable to the operation point shall be associated with the access unit.
    Otherwise, if the access unit contains a notDiscardablePic, a buffering period SEI message applicable to the operation point may or may not be associated with the access unit.
    Otherwise, the access unit shall not be associated with a buffering period SEI message applicable to the operation point.
  Otherwise (NalHrdBpPresentFlag and VclHrdBpPresentFlag are both equal to 0), no access unit in the CVS shall be associated with a buffering period SEI message.
  . . .
cpb_removal_delay_delta_minus1 plus1, when the current picture is not the first picture in the bitstream in decoding order, specifies a CPB removal delay increment value relative to the nominal CPB removal time of the picture prevNonDiscardablePic. The length of this syntax element is cpb_removal_delay_length_minus1+1 bits.

When the current picture contains a buffering period SEI message and concatenation_flag is equal to 0 and the current picture is not the first picture in the bitstream in decoding order, it is a requirement of bitstream conformance that the following constraint applies:
  If the picture prevNonDiscardablePic is not associated with a buffering period SEI message, the cpb_removal_delay_minus1 of the current picture shall be equal to the cpb_removal_delay_minus1 of prevNonDiscardablePic plus cpb_removal_delay_delta_minus1+1.
  Otherwise, cpb_removal_delay_minus1 shall be equal to cpb_removal_delay_delta_minus1.

NOTE 2—When the current picture contains a buffering period SEI message and concatenation_flag is equal to 1, the cpb_removal_delay_minus1 for the current picture is not used. The above-specified constraint can, under some circumstances, make it possible to splice bitstreams (that use suitably-designed referencing structures) by simply changing the value of concatenation_flag from 0 to 1 in the buffering period SEI message for an IRAP, EDR, or GDR picture at the splicing point. When concatenation_flag is equal to 0, the above-specified constraint enables the decoder to check whether the constraint is satisfied as a way to detect the loss of the picture prevNonDiscardablePic.

Figure 14:
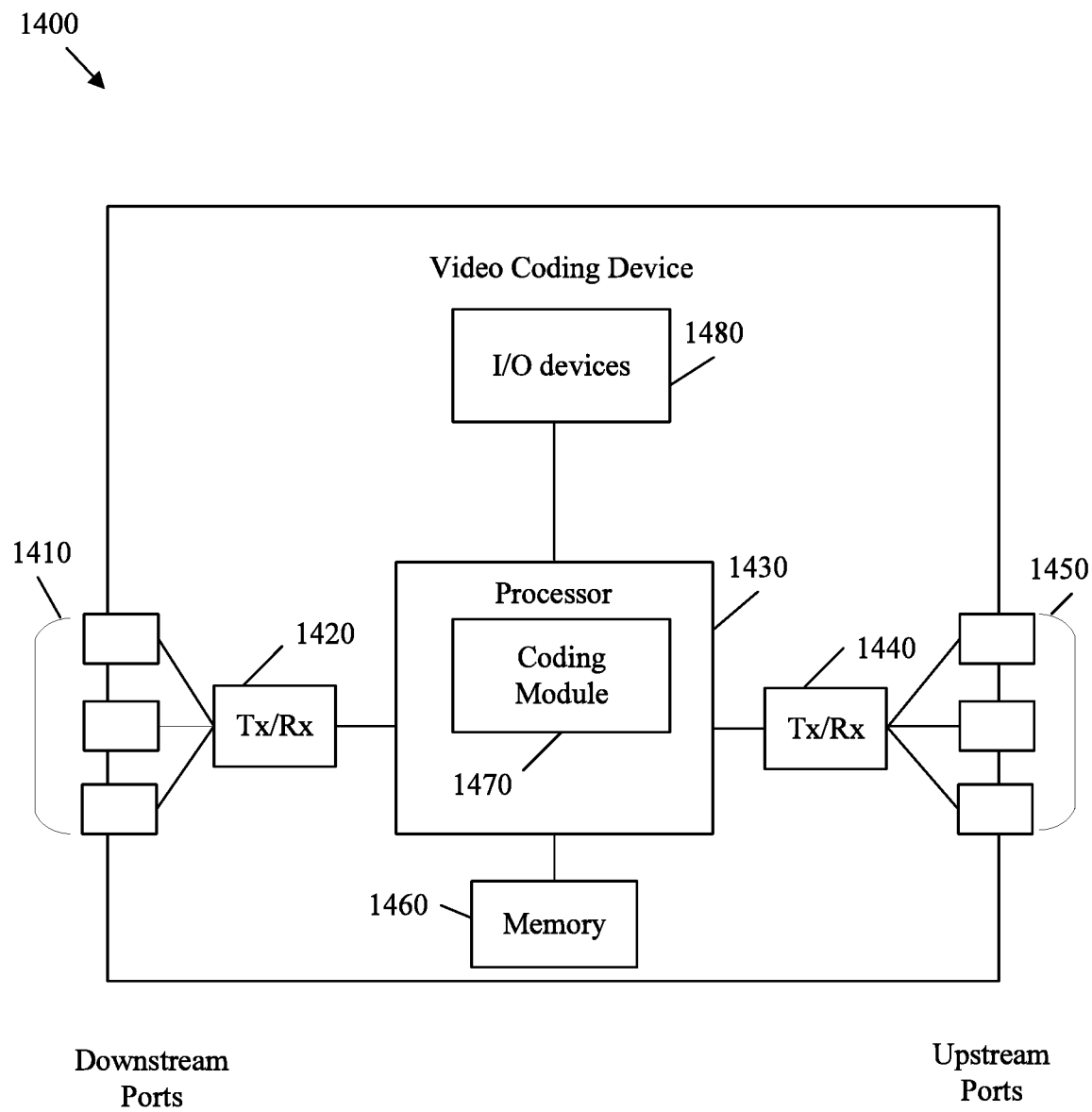
FIG. 14 is a schematic diagram of a video coding device.

FIG. 14 is a schematic diagram of a video coding device 1400 (e.g., a video encoder 300 or a video decoder 400) according to an embodiment of the disclosure. The video coding device 1400 is suitable for implementing the disclosed embodiments as described herein. The video coding device 1400 comprises ingress ports 1410 and receiver units (Rx) 1420 for receiving data; a processor, logic unit, or central processing unit (CPU) 1430 to process the data; transmitter units (Tx) 1440 and egress ports 1450 for transmitting the data; and a memory 1460 for storing the data. The video coding device 1400 may also comprise optical-to-electrical (OE) components and electrical-to-optical (EO) components coupled to the ingress ports 1410, the receiver units 1420, the transmitter units 1440, and the egress ports 1450 for egress or ingress of optical or electrical signals.

The processor 1430 is implemented by hardware and software. The processor 1430 may be implemented as one or more CPU chips, cores (e.g., as a multi-core processor), field-programmable gate arrays (FPGAs), application specific integrated circuits (ASICs), and digital signal processors (DSPs). The processor 1430 is in communication with the ingress ports 1410, receiver units 1420, transmitter units 1440, egress ports 1450, and memory 1460. The processor 1430 comprises a coding module 1470. The coding module 1470 implements the disclosed embodiments described above. For instance, the coding module 1470 implements, processes, prepares, or provides the various codec functions. The inclusion of the coding module 1470 therefore provides a substantial improvement to the functionality of the video coding device 1400 and effects a transformation of the video coding device 1400 to a different state. Alternatively, the coding module 1470 is implemented as instructions stored in the memory 1460 and executed by the processor 1430.

The video coding device 1400 may also include input and/or output (I/O) devices 1480 for communicating data to and from a user. The I/O devices 1480 may include output devices such as a display for displaying video data, speakers for outputting audio data, etc. The I/O devices 1480 may also include input devices, such as a keyboard, mouse, trackball, etc., and/or corresponding interfaces for interacting with such output devices.

The memory 1460 comprises one or more disks, tape drives, and solid-state drives and may be used as an overflow data storage device, to store programs when such programs are selected for execution, and to store instructions and data that are read during program execution. The memory 1460 may be volatile and/or non-volatile and may be read-only memory (ROM), random access memory (RAM), ternary content-addressable memory (TCAM), and/or static random-access memory (SRAM).

Figure 15:
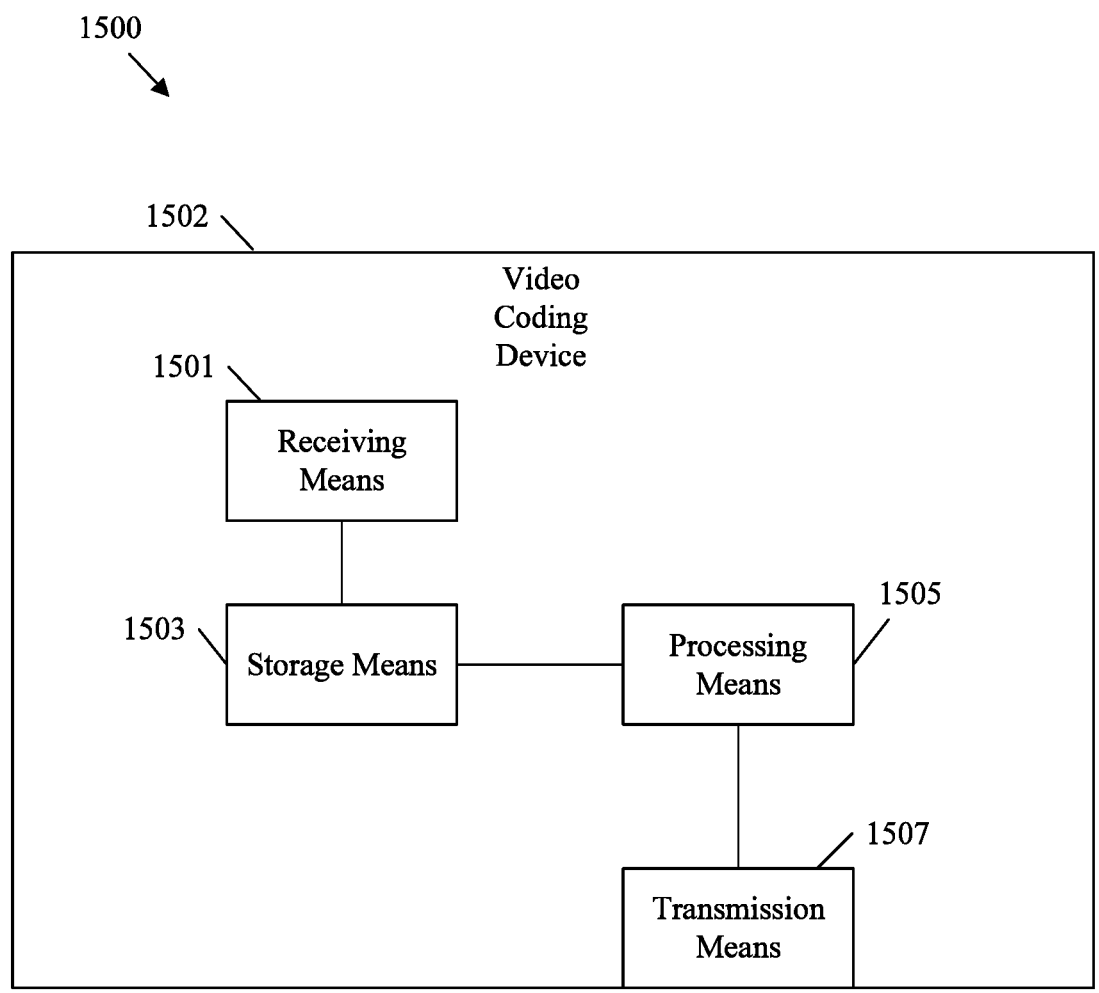
FIG. 15 is a schematic diagram of an embodiment of a means for coding.

FIG. 15 is a schematic diagram of an embodiment of a means for coding 1500. In an embodiment, the means for coding 1500 is implemented in a video coding device 1502 (e.g., a video encoder 300 or a video decoder 400). The video coding device 1502 includes receiving means 1501. The receiving means 1501 is configured to receive a picture to encode or to receive a bitstream to decode. The video coding device 1502 includes transmission means 1507 coupled to the receiving means 1501. The transmission means 1507 is configured to transmit the bitstream to a decoder or to transmit a decoded image to a display means (e.g., one of the I/O devices 1480).

The video coding device 1502 includes a storage means 1503. The storage means 1503 is coupled to at least one of the receiving means 1501 or the transmission means 1507. The storage means 1503 is configured to store instructions. The video coding device 1502 also includes processing means 1505. The processing means 1505 is coupled to the storage means 1503. The processing means 1505 is configured to execute the instructions stored in the storage means 1503 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of decoding implemented by a video decoder, comprising:
   receiving, by the video decoder, a bitstream containing an external decoder refresh (EDR) picture and a list of pictures for the EDR picture, wherein the list of pictures lists pictures referred to by entries in a first reference picture list, pictures referred to by entries in a second reference picture list, and external pictures in increasing decoding order, and wherein a difference between picture order count values for any two consecutive pictures in the list of pictures is greater than one half of a negative of maximum picture order count least significant bits and less than one half of the maximum picture order count least significant bits;
   obtaining, by the video decoder, an external picture from the external pictures referred to in the list of pictures; and
   decoding, by the video decoder, the EDR picture using the external picture that was obtained.

2. The method of claim 1, wherein the external picture is a reference EDR picture.

3. The method of claim 1, wherein the external picture is a reference intra random access point (IRAP) picture.

4. The method of claim 1, wherein the external picture is obtained from a second bitstream.

5. The method of claim 1, wherein the picture order count values are picture order count (POC) least significant bits (LSBs).

6. The method of claim 1, wherein the list of pictures containing the picture order count values are signaled in a slice header of the bitstream.

7. A method of encoding implemented by a video encoder, the method comprising:
   generating, by the video encoder, an external decoder refresh (EDR) picture and a list of pictures for the EDR picture, wherein the list of pictures lists pictures referred to by entries in a first reference picture list, pictures referred to by entries in a second reference picture list, and external pictures in increasing decoding order, and wherein a difference between picture order count values for any two consecutive pictures in the list of pictures is greater than one half of a negative of maximum picture order count least significant bits and less than one half of the maximum picture order count least significant bits;
   encoding, by the video encoder, the EDR picture and the list of pictures for the EDR picture into a bitstream; and
   storing, by the video encoder, the bitstream for transmission toward a video decoder.

8. The method of claim 7, wherein one of the external pictures is a reference EDR picture.

9. The method of claim 7, wherein one of the external pictures is a reference intra random access point (IRAP) picture.

10. The method of claim 7, wherein one of the external pictures is obtained from a second bitstream.

11. The method of claim 7, wherein the picture order count values are picture order count (POC) least significant bits (LSBs).

12. The method of claim 7, further comprising encoding the list of pictures containing the picture order count values in a slice header of the bitstream.

13. A decoding device, comprising:
    a receiver configured to receive a coded video bitstream;
    a memory coupled to the receiver, the memory storing instructions; and
    a processor coupled to the memory, the processor configured to execute the instructions to cause the decoding device to:
      receive a bitstream containing an external decoder refresh (EDR) picture and a list of pictures for the EDR picture, wherein the list of pictures lists pictures referred to by entries in a first reference picture list, pictures referred to by entries in a second reference picture list, and external pictures in increasing decoding order, and wherein a difference between picture order count values for any two consecutive pictures in the list of pictures is greater than one half of a negative of maximum picture order count least significant bits and less than one half of the maximum picture order count least significant bits;
      obtain an external picture from the external pictures referred to in the list of pictures; and
      decode the EDR picture using the external picture that was obtained.

14. The decoding device of claim 13, wherein the external picture is a reference EDR picture or a reference intra random access point (IRAP) picture.

15. The decoding device of claim 13, wherein the external picture is obtained from a second bitstream.

16. The decoding device of claim 13, wherein the picture order count values are picture order count (POC) least significant bits (LSBs).

17. The decoding device of claim 13, further comprising a display configured to display an image as generated based on the EDR picture.

18. An encoding device, comprising:
    a memory containing instructions;
    a processor coupled to the memory, the processor configured to implement the instructions to cause the encoding device to:
      generate an external decoder refresh (EDR) picture and a list of pictures for the EDR picture, wherein the list of pictures lists pictures referred to by entries in a first reference picture list, pictures referred to by entries in a second reference picture list, and external pictures in increasing decoding order, and wherein a difference between picture order count values for any two consecutive pictures in the list of pictures is greater than one half of a negative of maximum picture order count least significant bits and less than one half of the maximum picture order count least significant bits; and encode the EDR picture and the list of pictures for the EDR picture into a bitstream; and a transmitter coupled to the processor, the transmitter configured to transmit the bitstream toward a video decoder.

19. The encoding device of claim 18, wherein one of the external pictures is a reference EDR picture or a reference intra random access point (IRAP) picture.

20. The encoding device of claim 18, wherein one of the external pictures is obtained from a second bitstream.

21. The encoding device of claim 18, wherein the picture order count values are picture order count (POC) least significant bits (LSBs).

22. The encoding device of claim 18, wherein the memory stores the bitstream prior to the transmitter transmitting the bitstream toward the video decoder.

* * * * *